(12) United States Patent
Fu

(10) Patent No.: US 11,372,492 B2
(45) Date of Patent: Jun. 28, 2022

(54) DISPLAY PANEL AND DISPLAY DEVICE

(71) Applicant: Xiamen Tianma Micro-Electronics Co., Ltd., Xiamen (CN)

(72) Inventor: Jujian Fu, Shanghai (CN)

(73) Assignee: XIAMEN TIANMA MICRO-ELECTRONICS CO., LTD., Xiamen (CN)

(*) Notice: Subject to any disclaimer, the term of this patent is extended or adjusted under 35 U.S.C. 154(b) by 56 days.

(21) Appl. No.: 17/095,769

(22) Filed: Nov. 12, 2020

(65) Prior Publication Data
US 2021/0064175 A1 Mar. 4, 2021

(30) Foreign Application Priority Data
Sep. 30, 2020 (CN) .......................... 202011062136.7

(51) Int. Cl.
*G06F 3/041* (2006.01)
*G06F 3/044* (2006.01)

(52) U.S. Cl.
CPC .......... *G06F 3/0412* (2013.01); *G06F 3/0446* (2019.05); *G06F 3/04164* (2019.05)

(58) Field of Classification Search
None
See application file for complete search history.

(56) References Cited

U.S. PATENT DOCUMENTS

| 2016/0195983 | A1* | 7/2016 | Miyake | G06F 3/0443 345/174 |
| 2018/0122867 | A1* | 5/2018 | Choe | H01L 27/323 |
| 2018/0286925 | A1* | 10/2018 | Kim | H01L 51/5044 |
| 2021/0334494 | A1* | 10/2021 | Xi | G06V 40/1306 |

FOREIGN PATENT DOCUMENTS

| CN | 105741772 A | 7/2016 |
| CN | 109782959 A | 5/2019 |

* cited by examiner

*Primary Examiner* — Krishna P Neupane
(74) *Attorney, Agent, or Firm* — Kilpatrick Townsend & Stockton, LLP

(57) ABSTRACT

Provided are a display panel and a display device. The display panel includes a first substrate, a first electrode layer, a first touch layer and multiple light-emitting units. The first electrode layer includes a first electrode, and the first electrode includes multiple first hollows. The first touch layer is arranged in a different layer from the first electrode layer and is insulated from the first electrode layer. The first touch layer includes multiple first touch electrodes, each of the first touch electrodes includes multiple touch electrode segments. An orthographic projection of at least one of the touch electrode segments on the first substrate falls within an orthographic projection of the first electrode on the first substrate, so that the first touch electrodes are at least partially overlapped with the first electrode in a direction perpendicular to a plane where the first substrate is located.

19 Claims, 26 Drawing Sheets

DISPLAY PANEL AND DISPLAY DEVICE

The present application claims the priority to Chinese Patent Application No. 202011062136.7, titled "DISPLAY PANEL AND DISPLAY DEVICE", filed on Sep. 30, 2020 with the China National Intellectual Property Administration (CNIPA), which is incorporated herein by reference in its entirety.

FIELD

The present disclosure relates to the field of display technology, and in particular to a display panel and a display device.

BACKGROUND

With the development of touch technology, a touch display panel has been increasingly widely used, and the touch display panel has been gradually applied to various electronic devices in people's daily life. The existing touch display panels include an in-cell touch display panel and an out-cell touch display panel. Due to a smaller thickness, the in-cell touch display panel has gradually become a mainstream development trend of the touch display panel. However, the existing in-cell touch display panel has a large load upon performing touch detection.

SUMMARY

In order to solve the above technical problem, a display panel and a display device are provided in embodiments of the present disclosure, to reduce a load of the display panel when performing touch detection.

In order to solve the above technical problem, the technical solution is provided in embodiments of the present disclosure as follows.

A display panel includes:
a first substrate; and
a first electrode layer, a first touch layer and multiple light-emitting units which are all arranged on a side of the first substrate,
the first electrode layer includes a first electrode, the first electrode includes multiple first hollows, and the first electrode is configured to provide a first power supply voltage for the multiple light-emitting units;
the first touch layer is arranged in a different layer from the first electrode layer and is insulated from the first electrode layer, the first touch layer includes multiple first touch electrodes, each of the first touch electrodes is mesh-shaped and includes multiple touch electrode segments, and the multiple touch electrode segments are crossed to form meshes of the first touch electrode; and
an orthographic projection of at least one of the touch electrode segments on the first substrate falls within an orthographic projection of the first electrode on the first substrate.

A display device includes the above display panel.

In the technical solution according to the embodiments of the present disclosure, the first touch layer is arranged in a different layer from the first electrode layer and is insulated from the first electrode layer; the first touch layer includes multiple first touch electrodes, each of the first touch electrodes is mesh-shaped and includes multiple touch electrode segments; the multiple touch electrode segments are crossed to form meshes of the first touch electrode; an orthographic projection of at least one of the touch electrode segments on the first substrate falls within an orthographic projection of the first electrode on the first substrate, so that the first touch electrodes are at least partially overlapped with the first electrode in a direction perpendicular to a plane where the first substrate is located. As a result, when a driving signal is provided to the first touch electrodes, the driving signal may also be provided to the first electrode overlapped with the first touch electrodes, thus reducing a voltage difference between the first touch electrodes and the first electrode overlapped with the first touch electrodes, and reducing a load of the first touch electrodes when being driven, to reduce the load of the display panel when performing touch detection.

BRIEF DESCRIPTION OF THE DRAWINGS

The drawings to be used in the description of the embodiments will be described briefly as follows, so that the technical solutions according to the embodiments of the present disclosure will become clearer. It is apparent that the drawings in the following description only illustrate some embodiments of the present disclosure.

DETAILED DESCRIPTION

Hereinafter, the technical solutions according to embodiments of the present disclosure are described clearly and completely in conjunction with the drawings in the embodiments of the disclosure. It is apparent that the embodiments in the following description are only some embodiments of the present disclosure, rather than all of the embodiments.

The details will be described as follows, to better understand the present disclosure. The present disclosure may also be implemented in other ways different from those described herein.

The present disclosure is described in detail in conjunction with schematic diagrams. For ease of illustration, when the embodiments of the present disclosure are described in detail, a sectional view showing a device structure is partially enlarged without being shown according to a general scale. The schematic diagrams are only examples, which is not intended to limit the protection scope of the present disclosure. In addition, dimensional spatial dimensions of length, width and depth should be included in an actual manufacture.

As described in the background part, the existing in-cell touch display panel has a large load when the display panel is performing touch detection.

Figure 1:
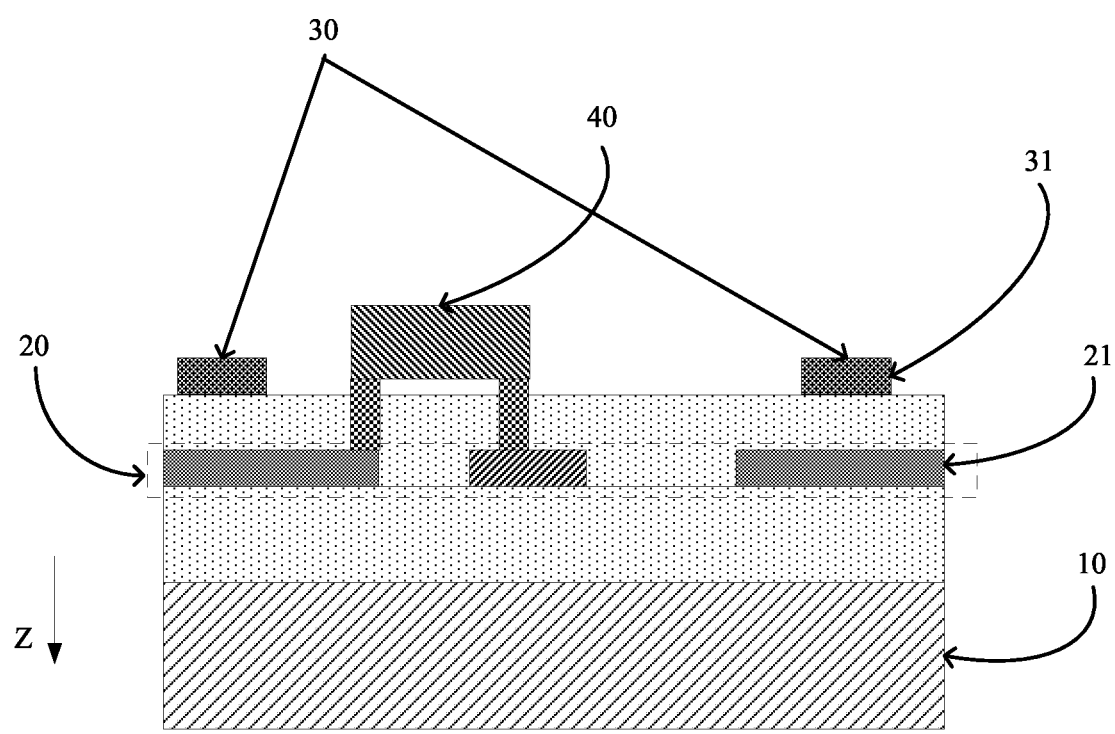
FIG. 1 is a schematic structural diagram of a display panel according to an embodiment of the present disclosure.
Figure 2:
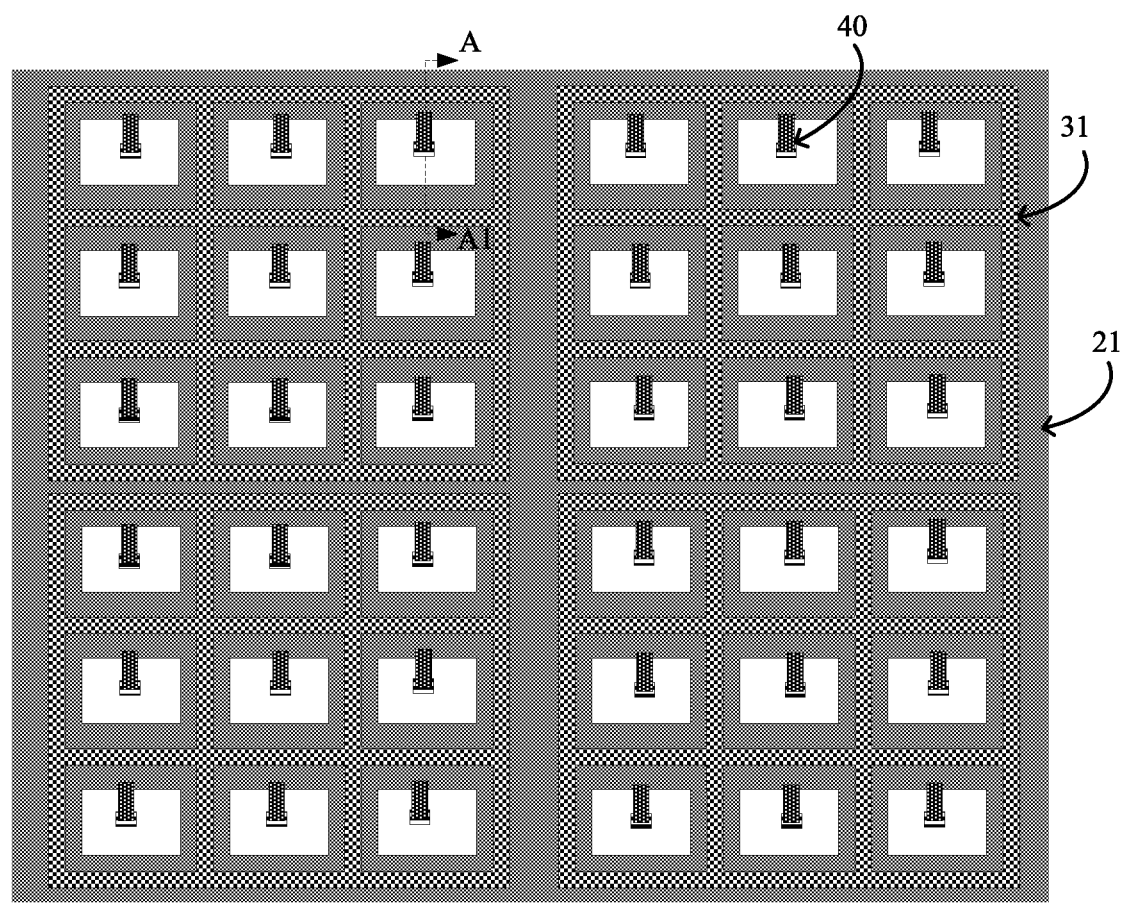
FIG. 2 is a vertical view of a display panel according to an embodiment of the present disclosure.
Figure 3:
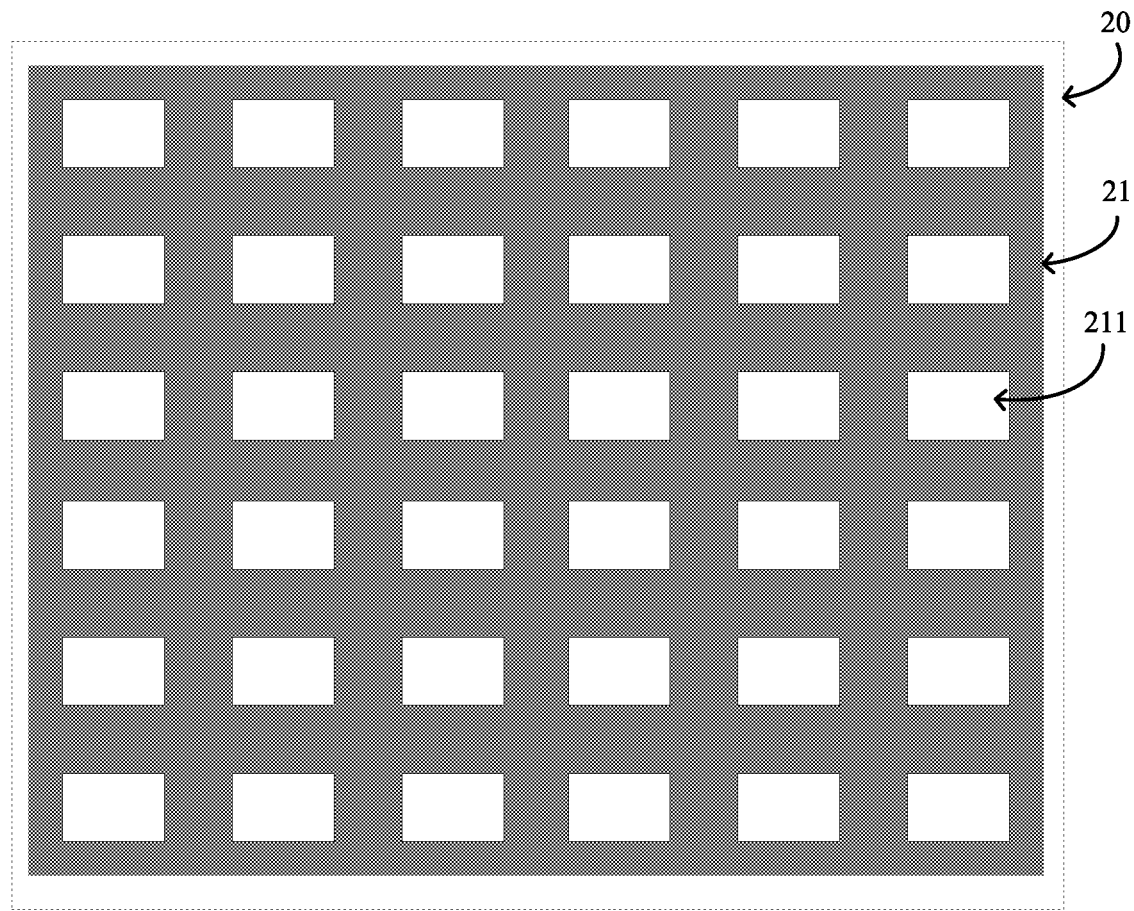
FIG. 3 is a vertical view of a first electrode layer in a display panel according to an embodiment of the present disclosure.
Figure 4:
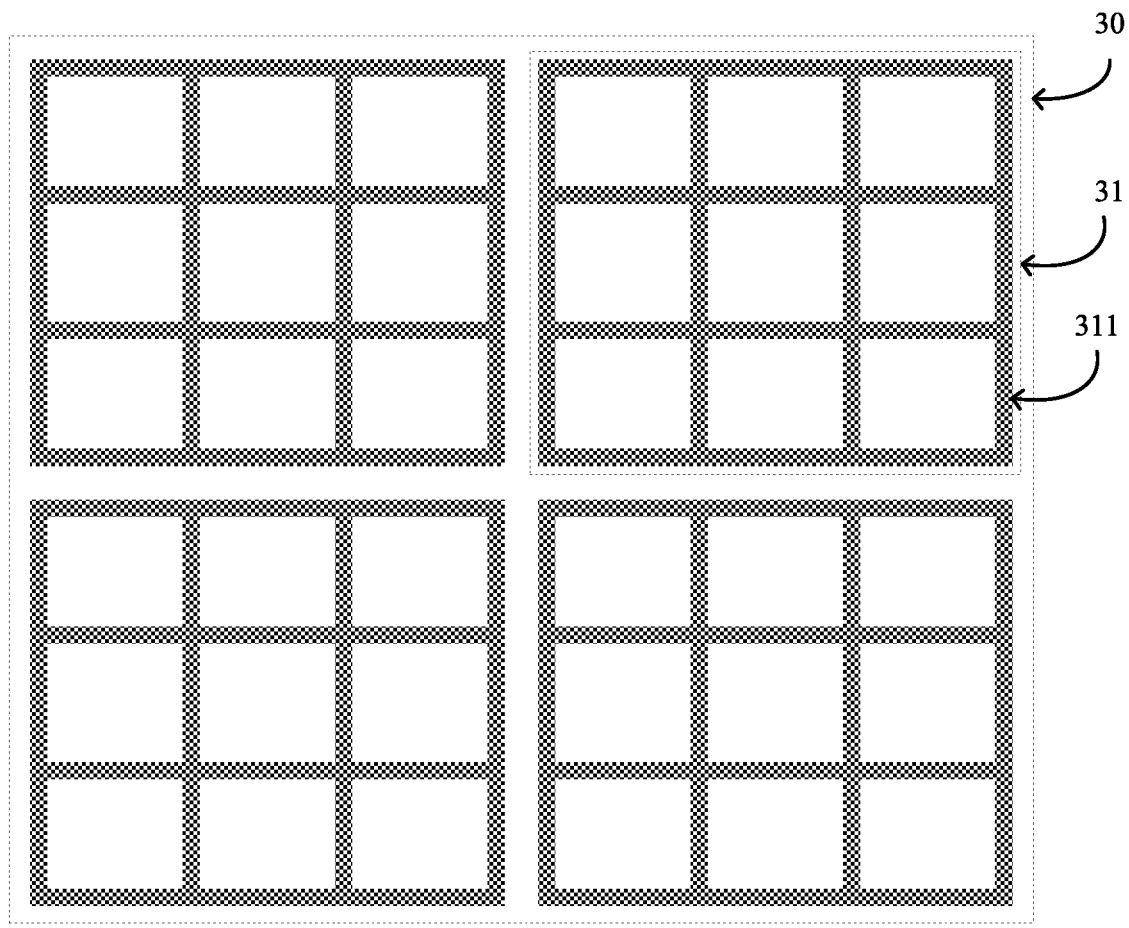
FIG. 4 is a vertical view of a first touch layer in a display panel according to an embodiment of the present disclosure.

In view of this, a display panel is provided in an embodiment of the present disclosure. As shown in FIG. 1 and FIG. 2, FIG. 1 is a sectional view of FIG. 2 along A-A1 direction. The display panel includes a first substrate 10, a first electrode layer 20, a first touch layer 30 and multiple light-emitting units 40. The first electrode layer 20, the first touch layer 30 and the light-emitting units 40 are all arranged on a side of the first substrate 10. As shown in FIG. 2 and FIG. 3, the first electrode layer 20 includes a first electrode 21, and the first electrode 21 includes multiple first hollows 211. The first electrode 21 is configured to provide a first power supply voltage for the light-emitting units 40. The first touch layer 30 is arranged in a layer different from the first electrode layer 20 and is insulated from the first electrode layer 20. The first touch layer 30 includes multiple first touch electrodes 31. As shown in FIG. 4, the first touch electrode 31 is mesh-shaped and includes multiple touch electrode segments 311. The multiple touch electrode segments 311 are crossed to form meshes of the first touch electrode 31. As shown in FIG. 1, in the embodiment of the present disclosure, an orthographic projection of at least one of the touch electrode segments of the first touch electrode 31 on the first substrate 10 falls within an orthographic projection of the first electrode 21 on the first substrate 10, so that the first touch electrode 31 is at least partially overlapped with the first electrode 21 in a direction Z perpendicular to a plane where the first substrate 10 is located. Therefore, when a driving signal is provided to the first touch electrode 31, the driving signal may be also provided to the first electrode 21 overlapped with the first touch electrode 31. As a result, a voltage difference between the first touch electrode 31 and the first electrode 21 overlapped with the first touch electrode 31 is reduced, and a load of the first touch electrode 31 when being driven is reduced, and reducing a load of the display panel when the display panel is performing a touch detection.

In one embodiment, based on the above embodiment, in an embodiment of the present disclosure, an orthographic projection of the entire first touch electrode on the first substrate falls within the orthographic projection of the first electrode on the first substrate, that is, an orthographic projection of each of the multiple touch electrode segments included in the first touch electrode on the first substrate falls within the orthographic projection of the first electrode on the first substrate. Therefore, when a driving signal is provided to the first touch electrode, the driving signal may also be provided to the first electrode overlapped with the first touch electrode, to reduce the voltage difference between the first touch electrode and the first electrode overlapped with the first touch electrode, which may reduce the load of the first touch electrode when being driven to the most extent and reduce the load of the display panel when the display panel is performing touch detection.

Moreover, in the display panel according to the embodiment of the present disclosure, the first touch layer is arranged inside the display panel so that a thickness of the display panel may be reduced by integrating the first touch layer into the display panel, which is suitable for the development of thinner and lighter display panels.

It should be noted that, in the embodiment of the present disclosure, the first electrode includes multiple first hollows, the first touch electrode is mesh-shaped, and an orthographic projection of the first touch electrode on the first substrate falls within the orthographic projection of the first electrode on the first substrate. Therefore, in an embodiment of the present disclosure, the first touch layer may be arranged on a side of the light-emitting units facing toward the first electrode layer, and the first touch layer is arranged in a same layer with a film layer between the light-emitting units and the first electrode layer, or the first touch layer may be arranged in a same layer with the light-emitting units, to further reduce the thickness of the display panel, which is suitable for the development of thinner and lighter display panels.

Figure 5:
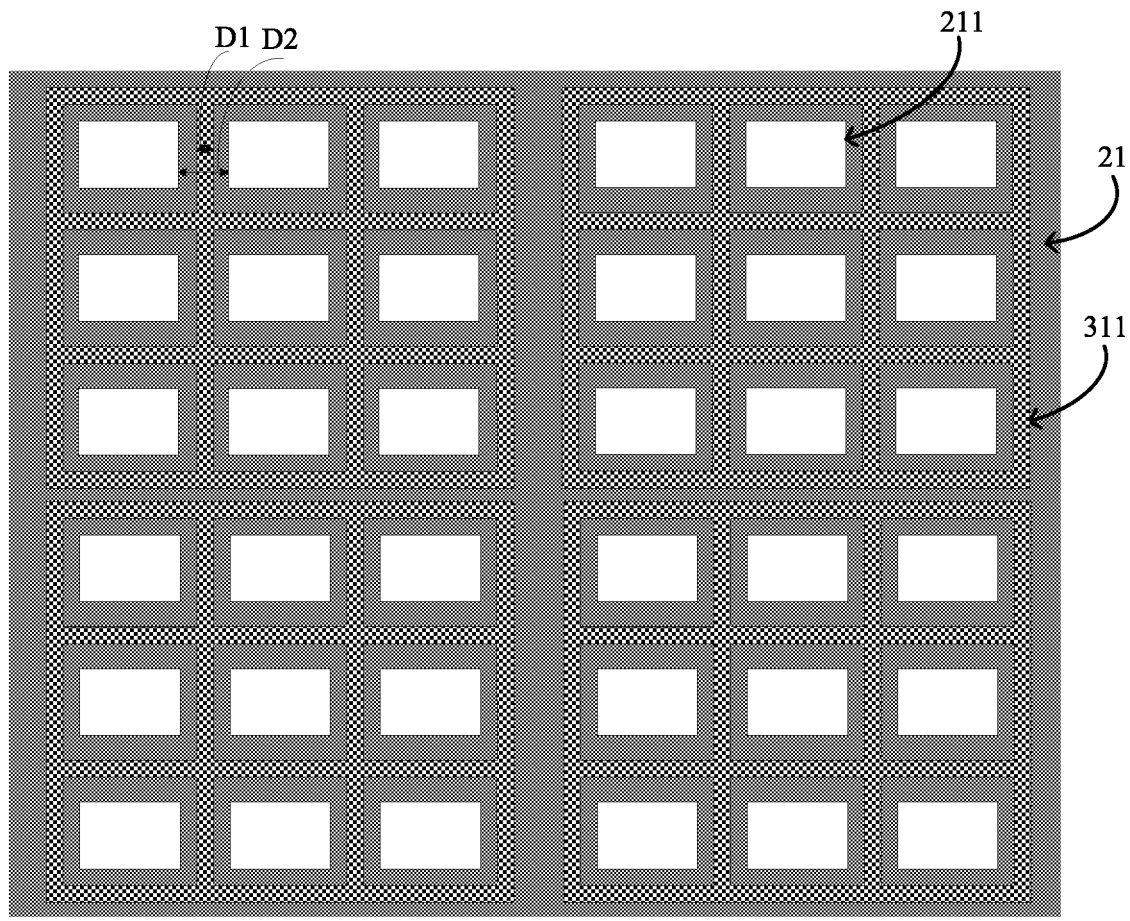
FIG. 5 is a schematic diagram showing a relative position between a first electrode layer and a first touch layer in a display panel according to an embodiment of the present disclosure.

Based on any one of the above embodiments, in an embodiment of the present disclosure, for a touch electrode segment, an orthographic projection of which on the first substrate falls within the orthographic projection of the first electrode on the first substrate, as shown in FIG. 5, an orthographic projection of the touch electrode segment 311 on the first electrode 21 is located between adjacent first hollows 211 of the first electrode 21. Moreover, a width of the touch electrode segment 311 is less than a distance between adjacent two first hollows 211 which are located on both sides of the touch electrode segment 311, so that the orthographic projection of the touch electrode segment 311 on the first substrate is entirely within the orthographic projection of the first electrode 21 on the first substrate.

In one embodiment, in an embodiment of the present disclosure, as shown in FIG. 5, the width D1 of the touch electrode segment 311 is greater than or equal to 1 µm, and the distance D2 between adjacent first hollows 211 of the first electrode 21 is greater than or equal to a sum of the width D1 of the touch electrode segment and an alignment deviation D0, so that the width of the touch electrode segment is less than the distance between adjacent two first hollows which are located on both sides of the touch electrode segment. In one embodiment, the alignment deviation D0 ranges from 0.5 µm to 1.5 µm, inclusive, which is not limited in the present disclosure, and depends on the actual situations.

Figure 6:
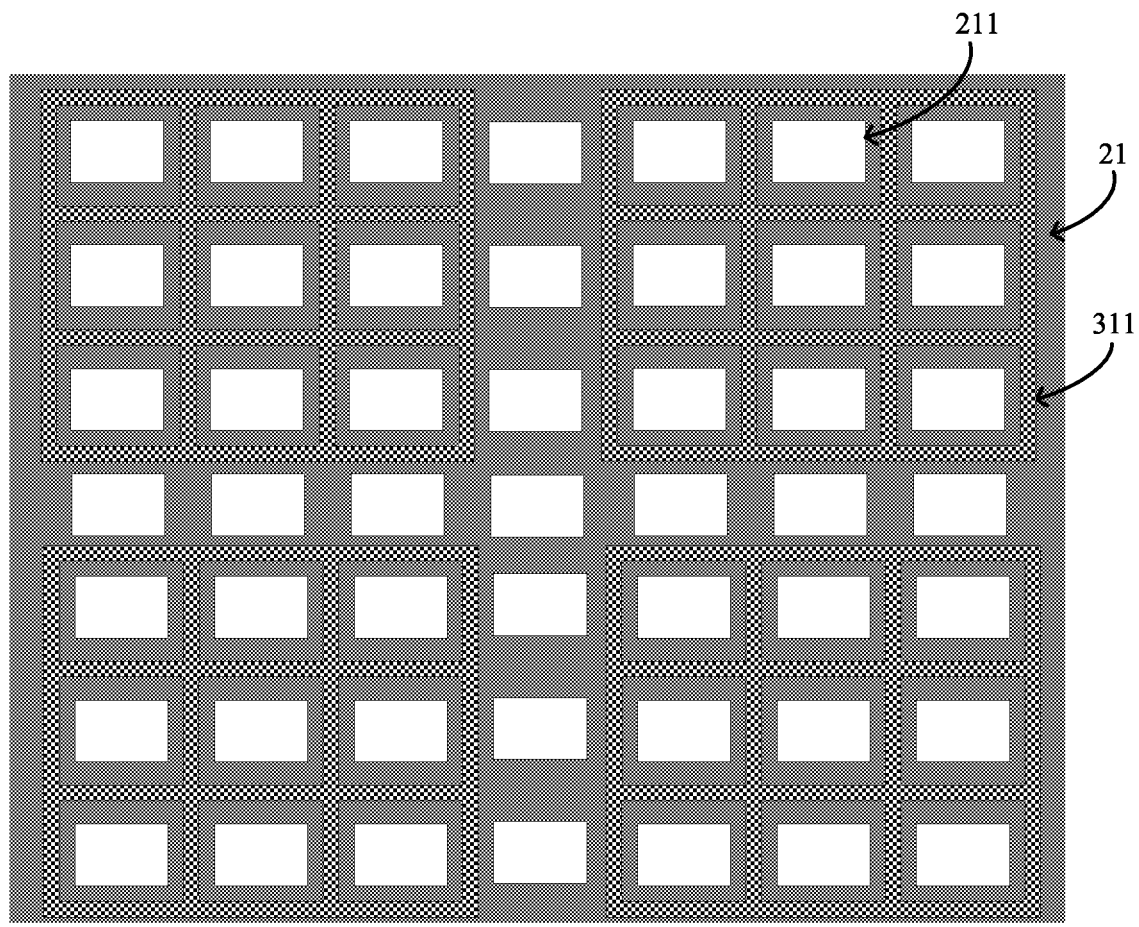
FIG. 6 is a schematic diagram showing a relative position between a first electrode layer and a first touch layer in a display panel according to another embodiment of the present disclosure.

Based on any one of the above embodiments, in an embodiment of the present disclosure, as shown in FIG. 5, an orthographic projection of at least part of the touch electrode segments 311 of at least two first touch electrodes on the first electrode 21 is located between a same pair of adjacent two first hollows 211, to make full use of gaps between the adjacent two first hollows 211 in the first electrode 21 and improve the accuracy in touch detection of the display panel. However, the present disclosure is not limited thereto. In another embodiment of the present disclosure, as shown in FIG. 6, an orthographic projection of a touch electrode segment 311 of a different first touch electrode on the first electrode 21 is located between a different pair of adjacent two first hollows 211. In one embodiment, there is only one touch electrode segment 311 between adjacent two first hollows 211, so that the touch electrode segments 311 can be evenly arranged in the display panel, to improve the evenness degree in touch detection of the display panel. The arrangement of the touch electrode segments 311 depends on the actual situations.

Figure 7:
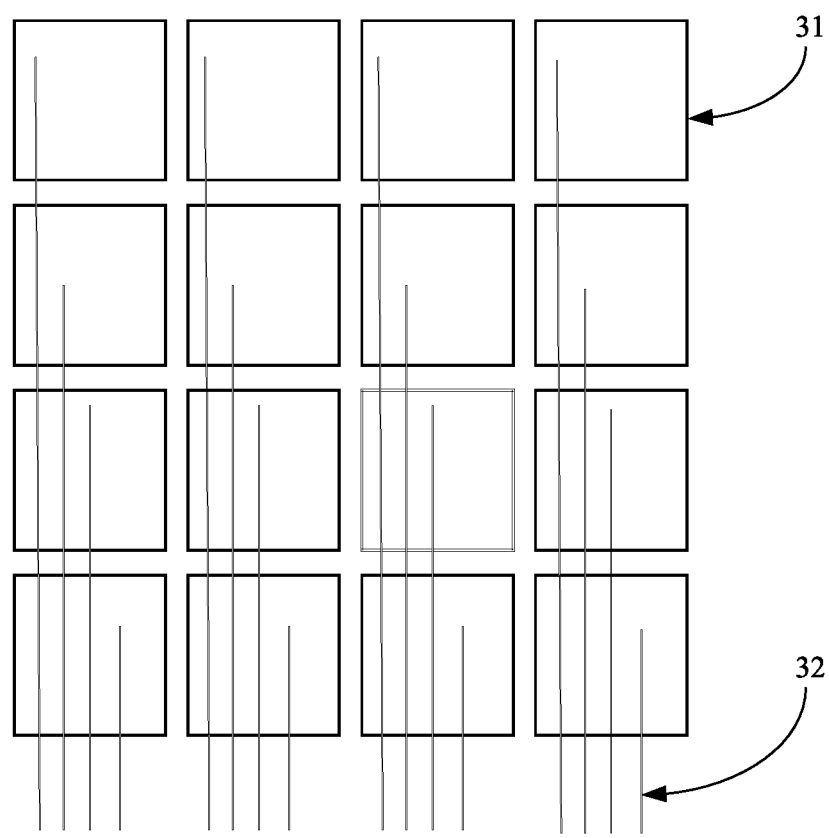
FIG. 7 is a vertical view of a first touch layer in a display panel according to another embodiment of the present disclosure.

Based on any one of the above embodiments, in an embodiment of the present disclosure, as shown in FIG. 7, the display panel further includes multiple touch signal lines 32. The touch signal line 32 is connected to the first touch electrode 31 and is configured to provide a touch detection signal for the first touch electrode 31. In one embodiment, the touch signal line 32 has a one-to-one correspondence with the first touch electrode 31. However, the present disclosure is not limited thereto, and the connection relationship of the touch signal lines and the first touch electrodes depends on the actual situations.

Figure 8:
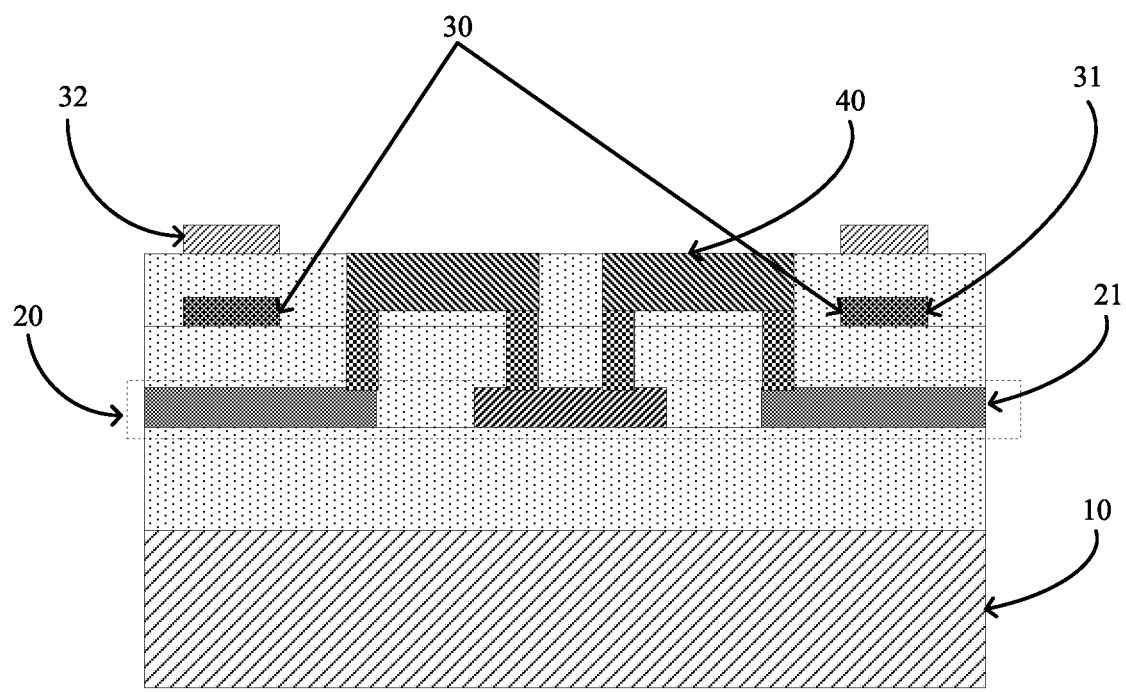
FIG. 8 is a schematic structural diagram of a display panel according to another embodiment of the present disclosure.
Figure 9:
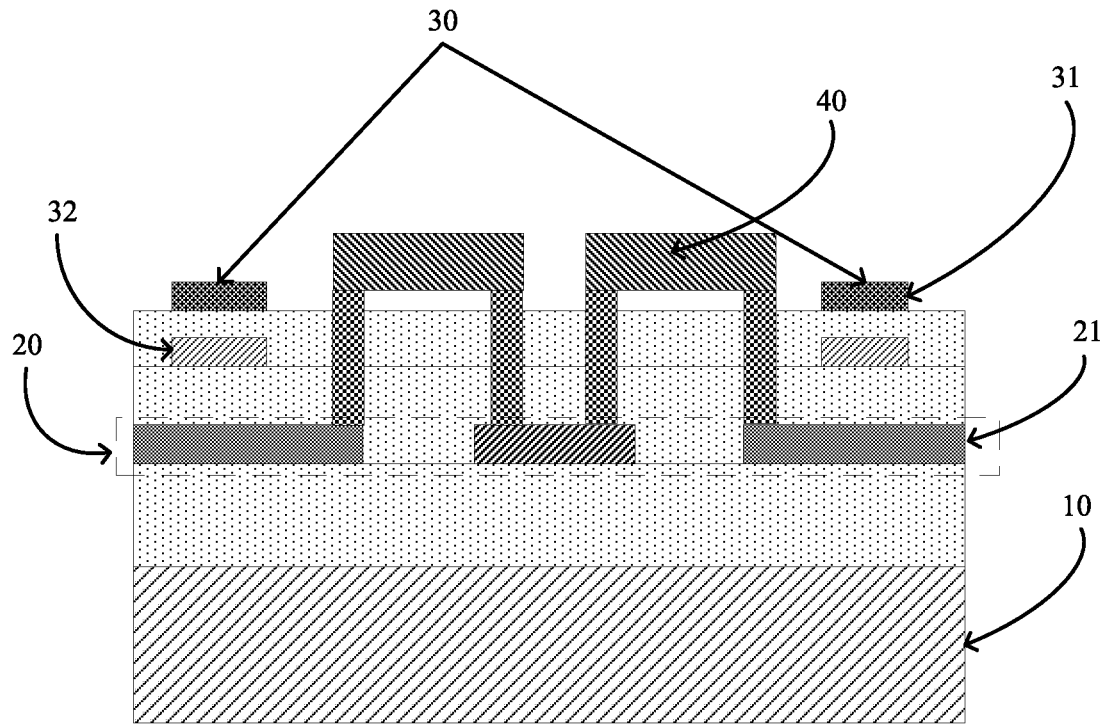
FIG. 9 is a schematic structural diagram of a display panel according to another embodiment of the present disclosure.

Based on the above embodiment, in an embodiment of the present disclosure, as shown in FIG. 8, the touch signal line 32 is arranged in a different layer from the first touch electrode 31. In one embodiment, in the embodiment of the present disclosure, the touch signal line 32 is arranged on a side of the first touch electrode 31 which is away from the first electrode 21, but the present disclosure is not limited thereto. In another embodiment of the present disclosure, as shown in FIG. 9, the touch signal line 32 may be arranged between the first touch electrode 31 and the first electrode 21, which depends on the actual situations.

It should be noted that, in a case that the touch signal line is arranged between the first touch electrode and the first electrode, in one embodiment of the present disclosure, an orthographic projection of the touch signal line on the first substrate is within the orthographic projection of the first electrode on the first substrate, so that the touch signal line is overlapped with the first electrode in a direction perpendicular to the first substrate. Therefore, when a signal is transmitted on the touch signal line, a driving signal is provided to the first electrode overlapped with the touch signal line. Thus, a voltage difference between the touch signal line and the first electrode is reduced, and a load of the touch signal line is reduced, and reducing the load of the display panel when the display panel is performing touch detection.

Figure 10:
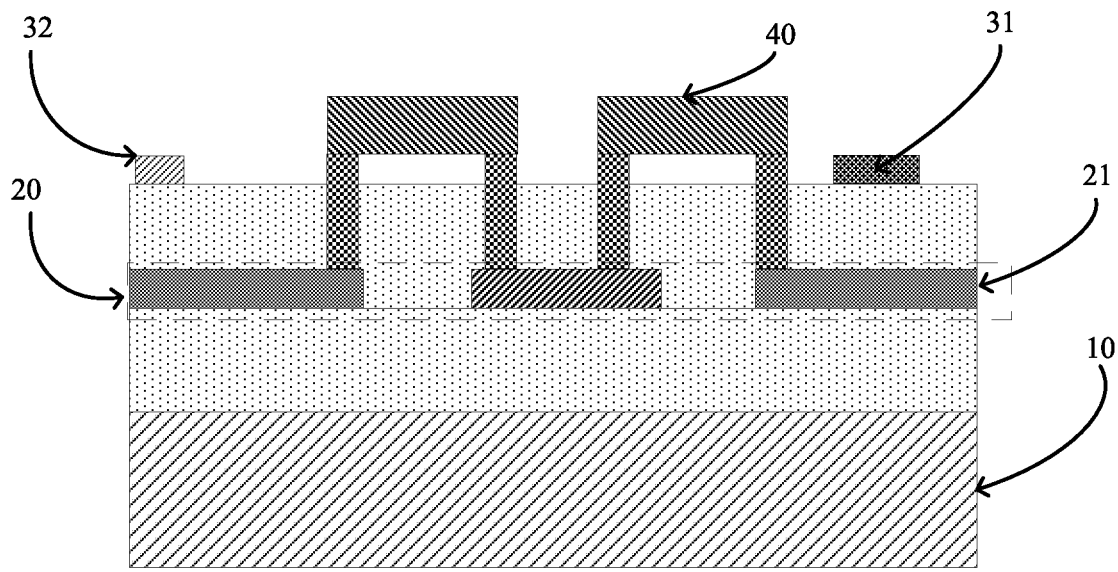
FIG. 10 is a schematic structural diagram of a display panel according to another embodiment of the present disclosure.
Figure 11:
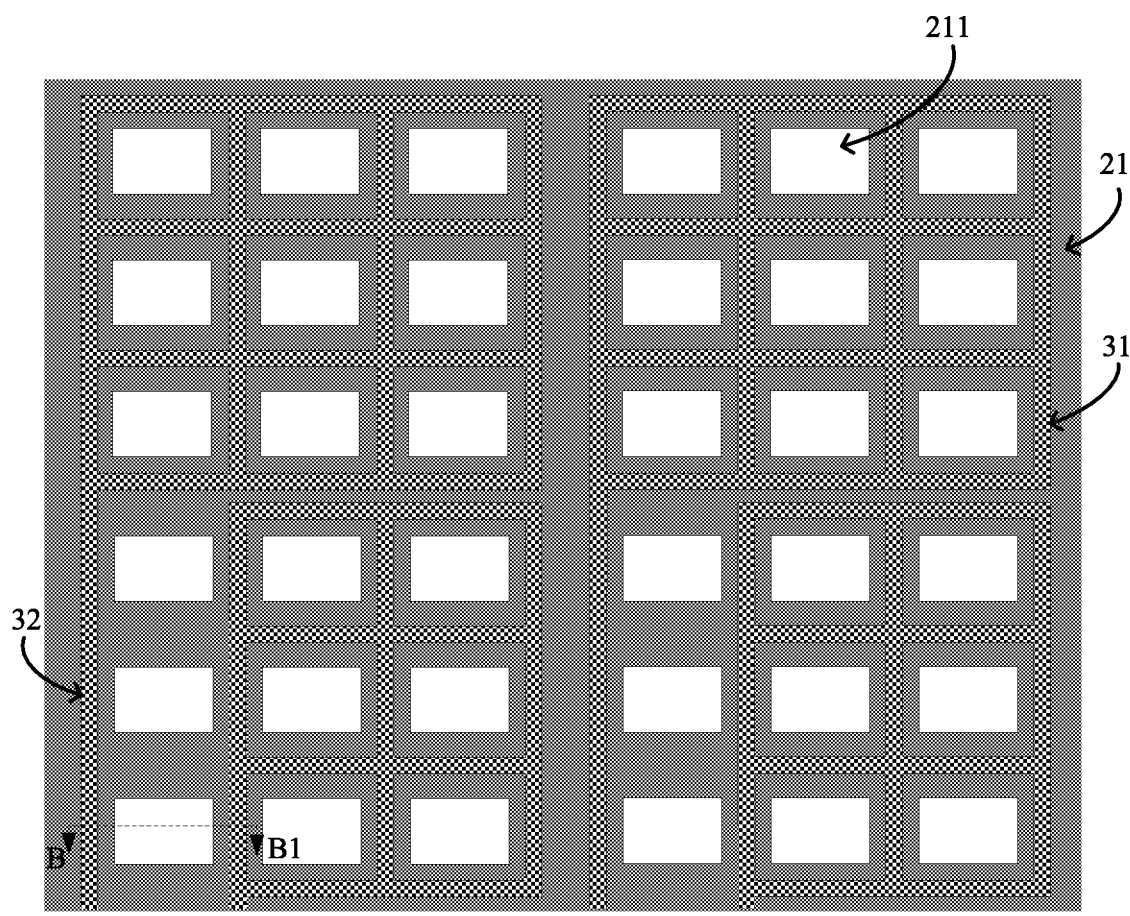
FIG. 11 is a schematic diagram showing a relative position between a first electrode layer and a first touch layer in a display panel according to another embodiment of the present disclosure.

In another embodiment of the present disclosure, as shown in FIG. 10 and FIG. 11, FIG. 10 is a sectional view of FIG. 11 along B-B1 direction. The touch signal line 32 is arranged in a same layer with the first touch electrode 31, and an orthographic projection of the touch signal line 32 on the first substrate 10 falls within an orthographic projection of the first electrode 21 on the first substrate 10, so that the touch signal line 32 is overlapped with the first electrode 21 in a direction perpendicular to the first substrate 10. Therefore, when a signal is transmitted on the touch signal line 32, a driving signal is provided to the first electrode 21 overlapped with the touch signal line 32. Thus, a voltage difference between the touch signal line 32 and the first electrode 21 is reduced, and a load of the touch signal line 32 is reduced, and reducing the load of the display panel 10 when the display panel 10 is performing touch detection.

Based on any one of the above embodiments, in an embodiment of the present disclosure, as shown in FIG. 11, an orthographic projection of the touch signal line 32 on the first electrode 21 is located between a same pair of adjacent two first hollows 211, and the width of the touch signal line 32 is less than a distance between adjacent two first hollows 211, so that an orthographic projection of the touch signal line 32 on the first substrate totally falls within an orthographic projection of the first electrode 21 on the first substrate.

In one embodiment, in an embodiment of the present disclosure, the width D3 of the touch signal line is greater than or equal to 1 µm, and the distance D2 between adjacent first hollows in the first electrode 21 is greater than or equal to a sum of the width D3 of the touch signal line and an alignment deviation D0, so that the width of the touch signal line is less than the distance between adjacent two first hollows which are located on both sides of the touch signal line. In one embodiment, the alignment deviation D0 ranges from 0.5 µm to 1.5 µm, inclusive. The present disclosure is not limited thereto, and the value of the alignment deviation D0 depends on the actual situations.

Figure 12:
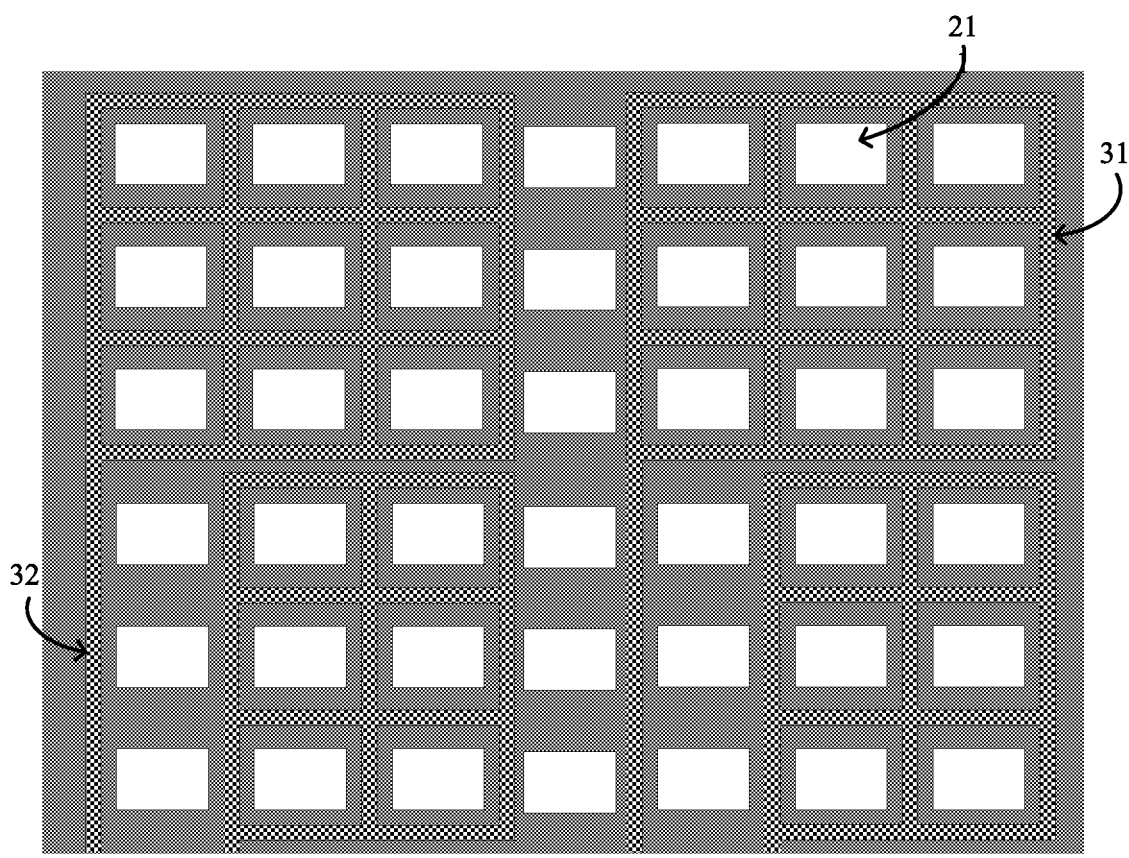
FIG. 12 is a schematic diagram showing a relative position between a first electrode layer and a first touch layer in a display panel according to another embodiment of the present disclosure.

Based on any one of the above embodiments, in an embodiment of the present disclosure, as shown in FIG. 12, in a case that the touch signal lines 32 are arranged in a same layer with the first touch electrodes 31, an orthographic projection of one of the touch signal lines 32 on the first electrode is independently located between adjacent two first hollows 211, rather than sharing a gap between a same pair of adjacent two first hollows 211 with a projection of the touch electrode segment on a plane where the first electrode is located. In another embodiment of the present disclosure, as shown in FIG. 11, in a case that the touch signal lines 32 are arranged in a same layer with the first touch electrodes 31, an orthographic projection of one of the touch signal lines 32 on the first electrode 21 is located between a same pair of adjacent two first hollows 211 with an orthographic projection of at least one of the touch electrode segments on the first electrode 21, to make full use of gaps between the multiple first hollows 211, and improve the accuracy in touch detection of the display panel.

In one embodiment, in an embodiment of the present disclosure, an orthographic projection of one of the touch signal lines on the first electrode layer is located between a same pair of adjacent two first hollows with an orthographic projection of at least two of the touch electrode segments on the first electrode layer, to make full use of gaps between the adjacent two first hollows to accommodate the touch signal line, which is not limited in the present disclosure and depends on the actual situations.

Figure 13:
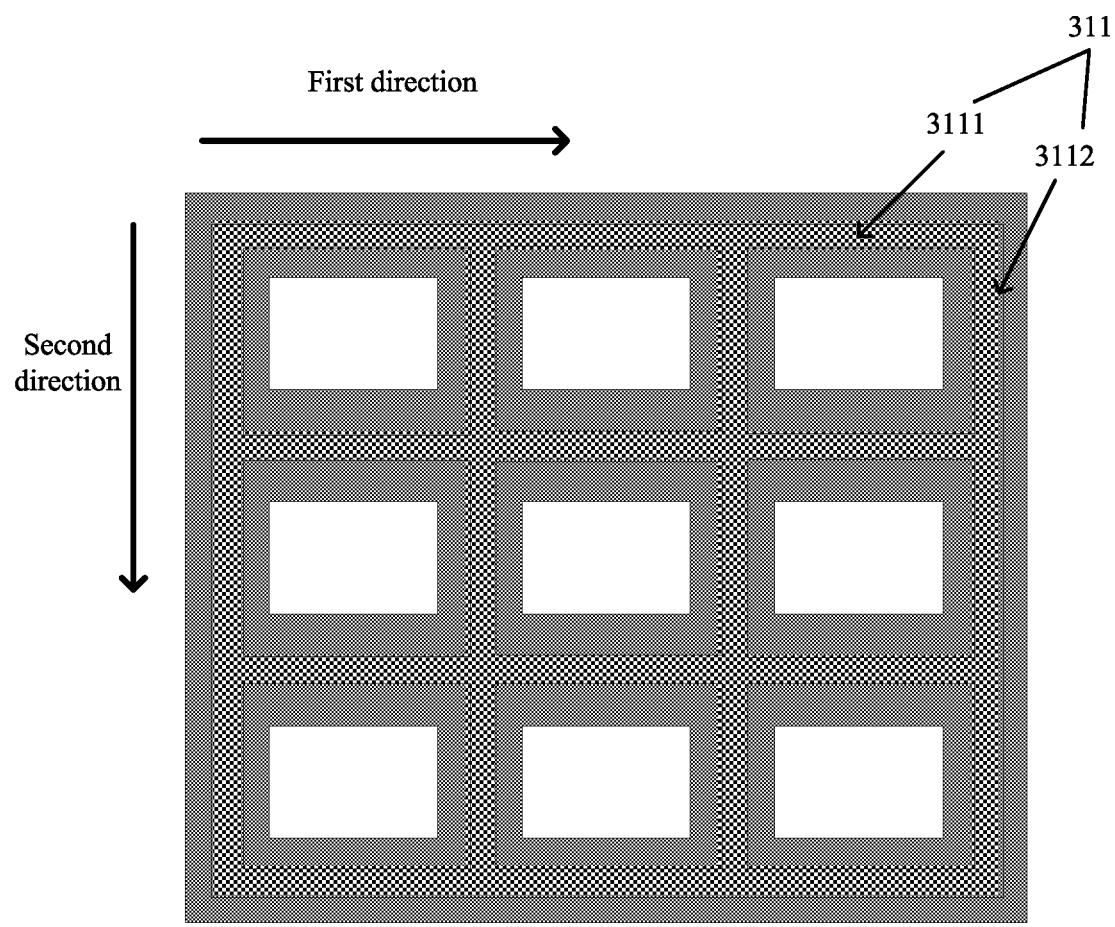
FIG. 13 is a vertical view of a first touch electrode in a display panel according to another embodiment of the present disclosure.

Based on any one of the above embodiments, in an embodiment of the present disclosure, as shown in FIG. 13, the multiple touch electrode segments 311 include a first touch electrode segment 3111 and a second touch electrode segment 3112 which are crossed with each other. The first touch electrode segment 3111 extends along a first direction, and the second touch electrode segment 3112 extends along a second direction. The first direction and the second direction are both parallel to a plane where the first substrate is located, and the first direction is crossed with the second direction. In an embodiment of the present disclosure, the multiple first hollows are arranged in an array, the first electrode covers the first touch electrode segment and the second touch electrode segment which are cross-connected, so that an orthographic projection of each part of the first touch electrode segment and the second touch electrode segment on the first substrate totally falls within the orthographic projection of the first electrode on the first substrate.

It should be noted that the first touch electrode segment 3111 and the second touch electrode segment 3112 may be a structure formed by a same patterning process on a same film layer.

It should be noted that, in an embodiment of the present disclosure, the first electrode covers the first touch electrode segment and the second touch electrode segment which are cross-connected, means that the first electrode excluding the multiple first hollows covers the first touch electrode segment and the second touch electrode segment which are cross-connected. That is, in an embodiment of the present disclosure, the first electrode is also a mesh-shaped electrode, and meshes of the first electrode are regions where the first hollows are located.

Figure 14:
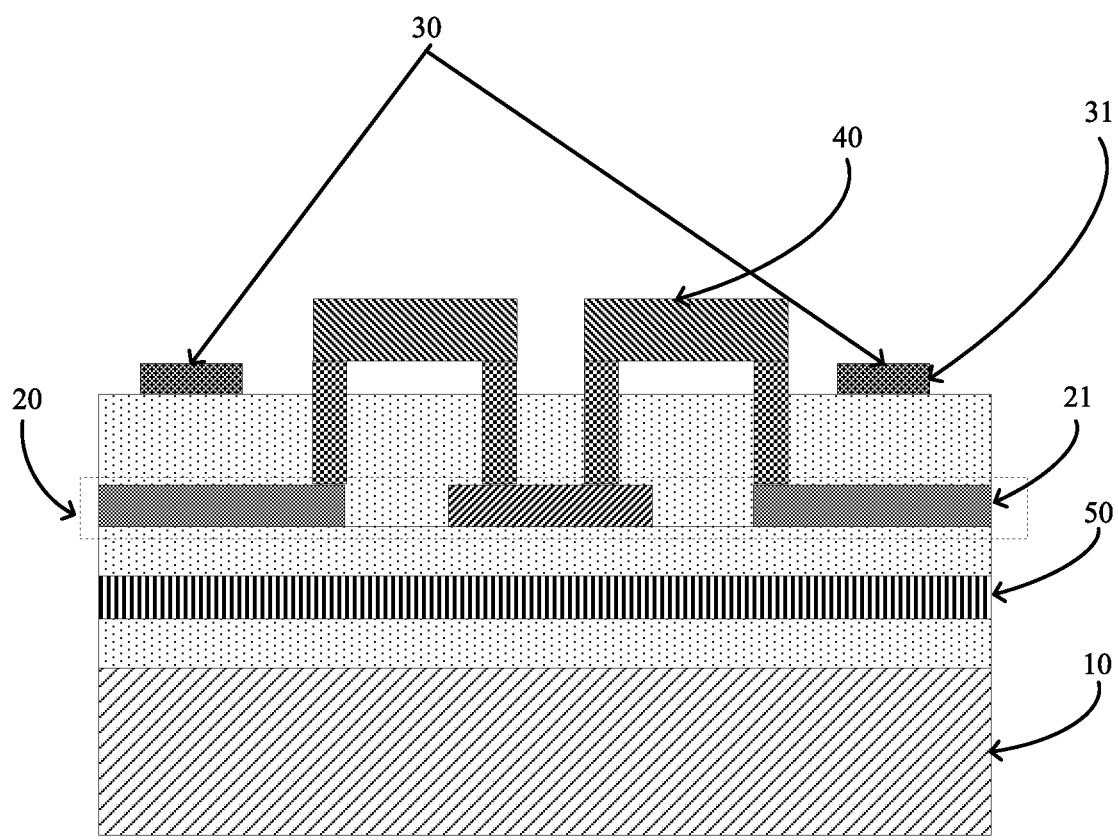
FIG. 14 is a schematic structural diagram of a display panel according to another embodiment of the present disclosure.

Based on any one of the above embodiments, in an embodiment of the present disclosure, as shown in FIG. 14, the display panel further includes a driving circuit layer 50. The driving circuit layer 50 is arranged between the first substrate 10 and the first electrode layer 20, and the first touch layer 30 is arranged on a side of the first electrode layer 20 which is away from the first substrate 10, to reduce a distance between the driving circuit layer 50 and the first electrode layer 20, and to reduce an attenuation of a signal outputted from the driving circuit layer 50 in transmission to the first electrode layer 20. However, the present disclosure is not limited thereto, and it depends on the actual situations.

Figure 15:
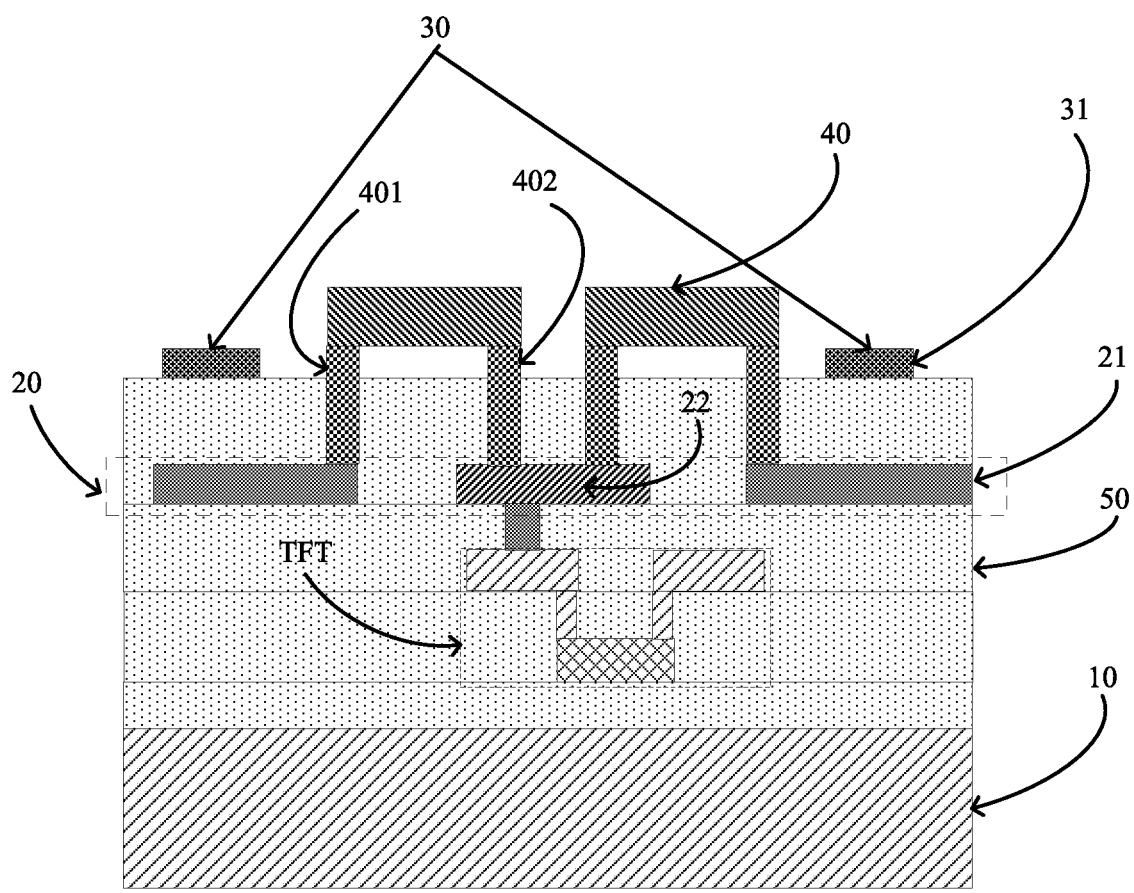
FIG. 15 is a schematic structural diagram of a display panel according to another embodiment of the present disclosure.
Figure 16:
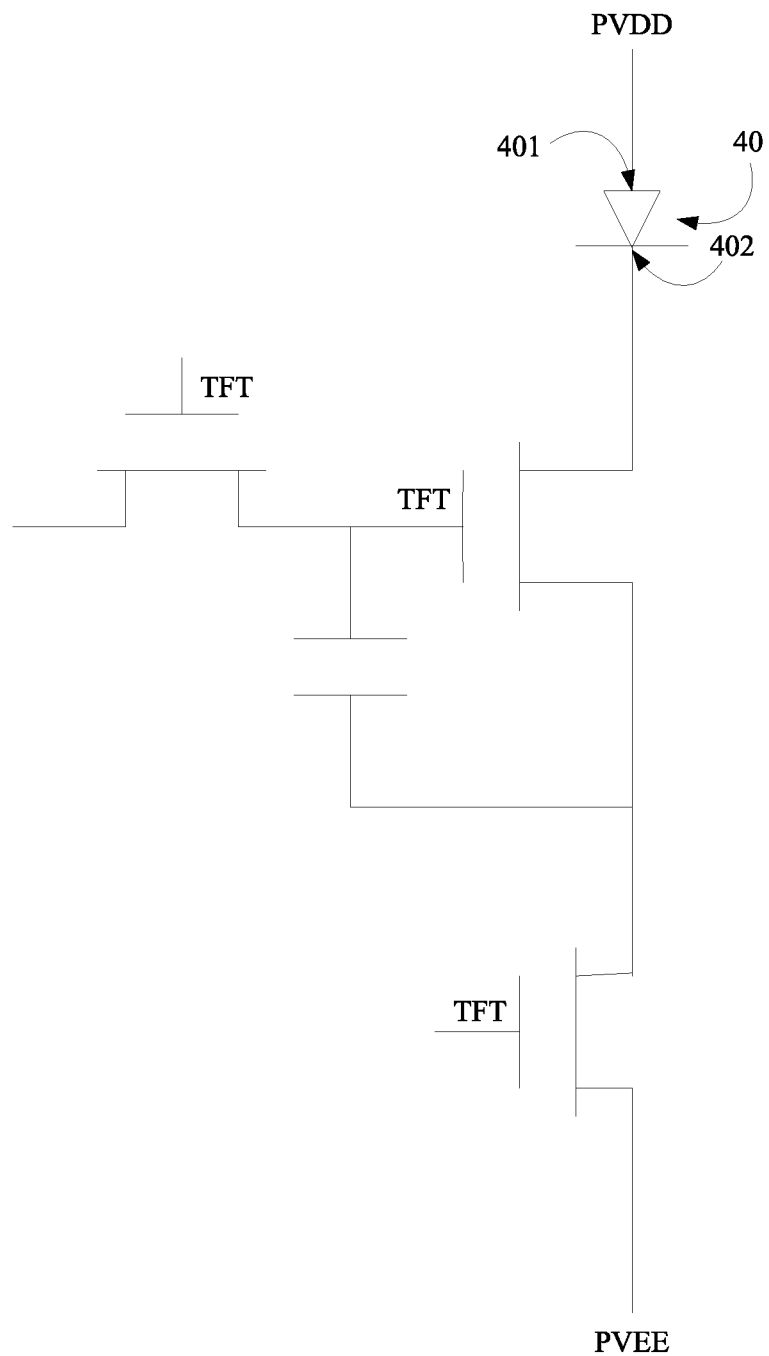
FIG. 16 is a schematic diagram showing an electrical connection of a light-emitting unit in a display panel according to another embodiment of the present disclosure.

Based on the above embodiments, in an embodiment of the present disclosure, as shown in FIG. 15 and FIG. 16, the driving circuit layer includes multiple thin film transistors (TFT). In the embodiment of the present disclosure, the light-emitting units 40 each includes a first contact electrode 401 and a second contact electrode 402. The first contact electrode 401 is electrically connected with the first electrode 21, and the second contact electrode 402 is electrically connected with the multiple TFTs, to provide a first power supply voltage to the first contact electrode 401 via the first electrode and control the light-emitting units 40 to emit light by the multiple TFTs.

Figure 17:
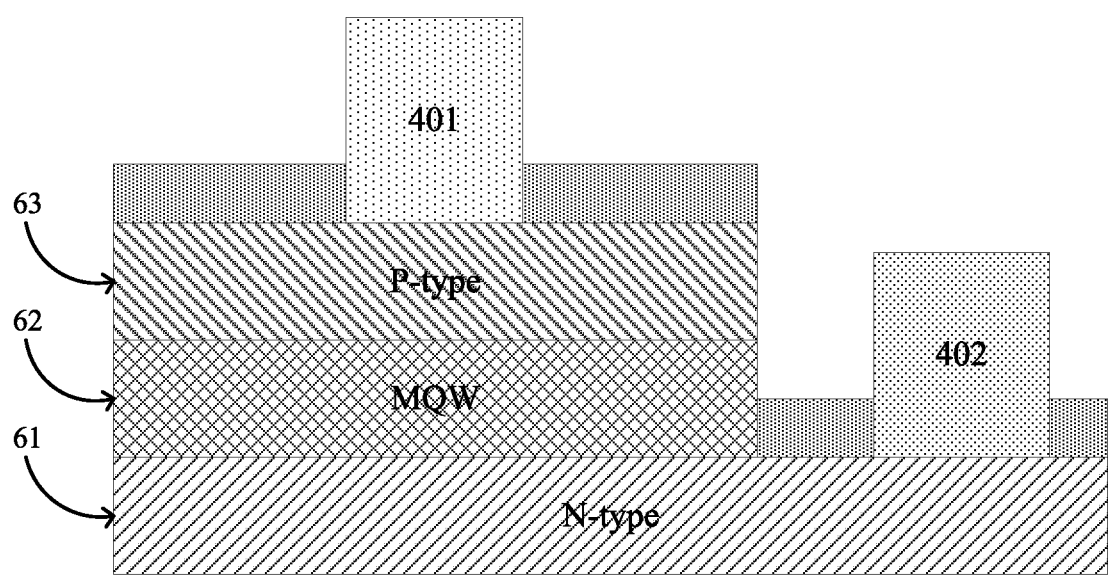
FIG. 17 is a schematic structural diagram of a light-emitting unit in a display panel according to another embodiment of the present disclosure.

In one embodiment, based on the above embodiments, in an embodiment of the present disclosure, as shown in FIG. 15, the light-emitting units 40 are arranged on a side of the first electrode layer 20 which is away from the first substrate 10, so that the light-emitting units 40 do not affect a signal transmission between the driving circuit layer 50 and the first electrode layer 20 with ensuring the connection between the light-emitting units 40 and the first electrode layer 20. In the embodiment of the present disclosure, the light-emitting units each includes an inorganic light-emitting diode. As shown in FIG. 17, the light-emitting diode includes a first semiconductor layer 61, an active layer 62 and a second semiconductor layer 63 which are stacked. The active layer 62 is arranged between the first semiconductor layer 61 and the second semiconductor layer 63, and the first semiconductor layer 61 has a different doping type to the second semiconductor layer 63, so that the active layer 62 may be controlled to emit light when different voltages are applied to the first semiconductor layer 61 and the second semiconductor layer 63. In an embodiment of the present disclosure, the first semiconductor layer 61 is a N-type semiconductor layer, and the second semiconductor layer 63 is a P-type semiconductor layer. However, the present disclosure is not limited thereto, and it depends on the actual situations.

Figure 18:
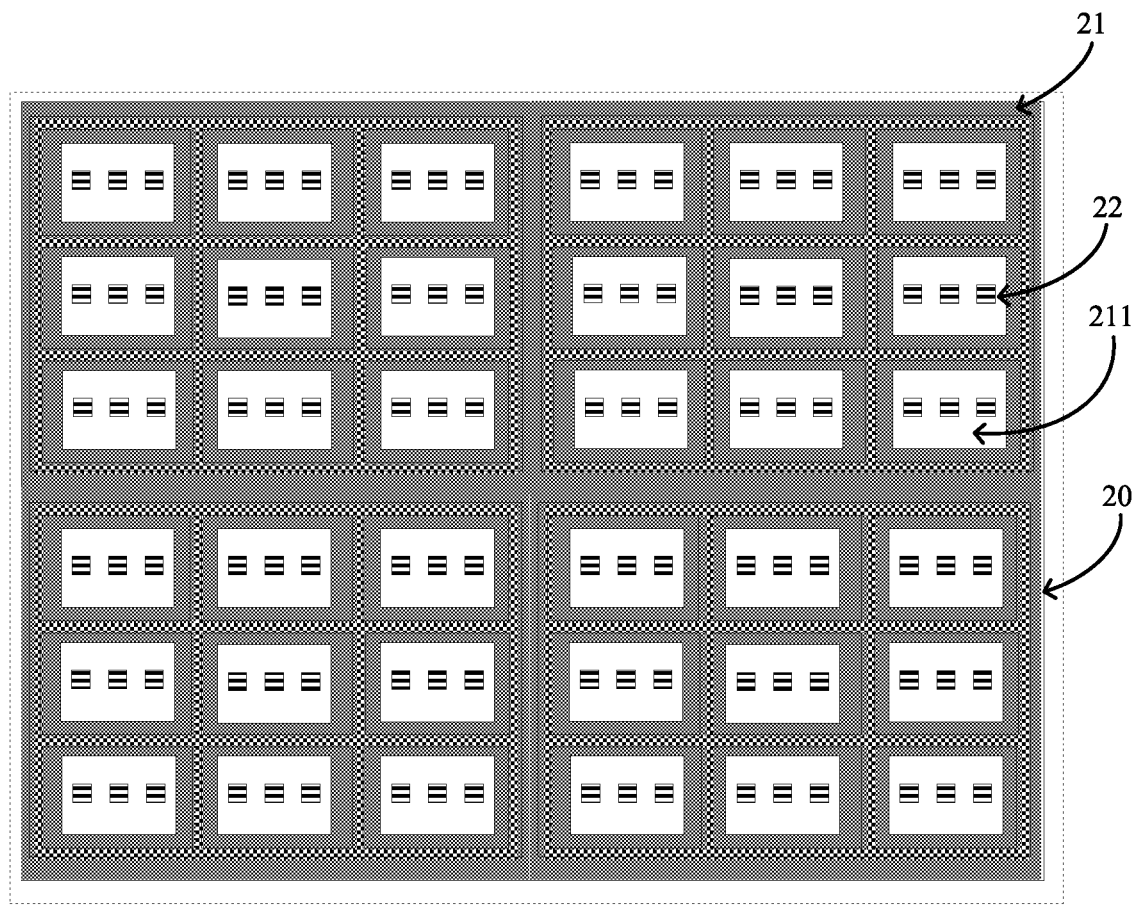
FIG. 18 is a vertical view of a display panel according to another embodiment of the present disclosure.

Based on the above embodiments, in an embodiment of the present disclosure, as shown in FIG. 15 and FIG. 18, the first electrode layer 20 further includes multiple second electrodes 22. The second electrodes 22 are arranged in the first hollows 211. The second electrodes 22 are insulated from the first electrode 21, and the second electrodes 22 are electrically connected with the second contact electrodes. It should be noted that, in the embodiment of the present disclosure, the second electrodes 22 are connected with a third electrode via the multiple TFTs. The third electrode is configured to provide a second power supply voltage.

When the display panel is in an operation, a first power supply voltage is provided by the first electrode to the light-emitting units, a second power supply voltage provided by the third electrode is transmitted to the light-emitting units via the multiple TFTs and the second electrode, and a current flowing through the light-emitting units is controlled by the multiple TFTs, to control a light-emitting state of the light-emitting units.

Figure 19:
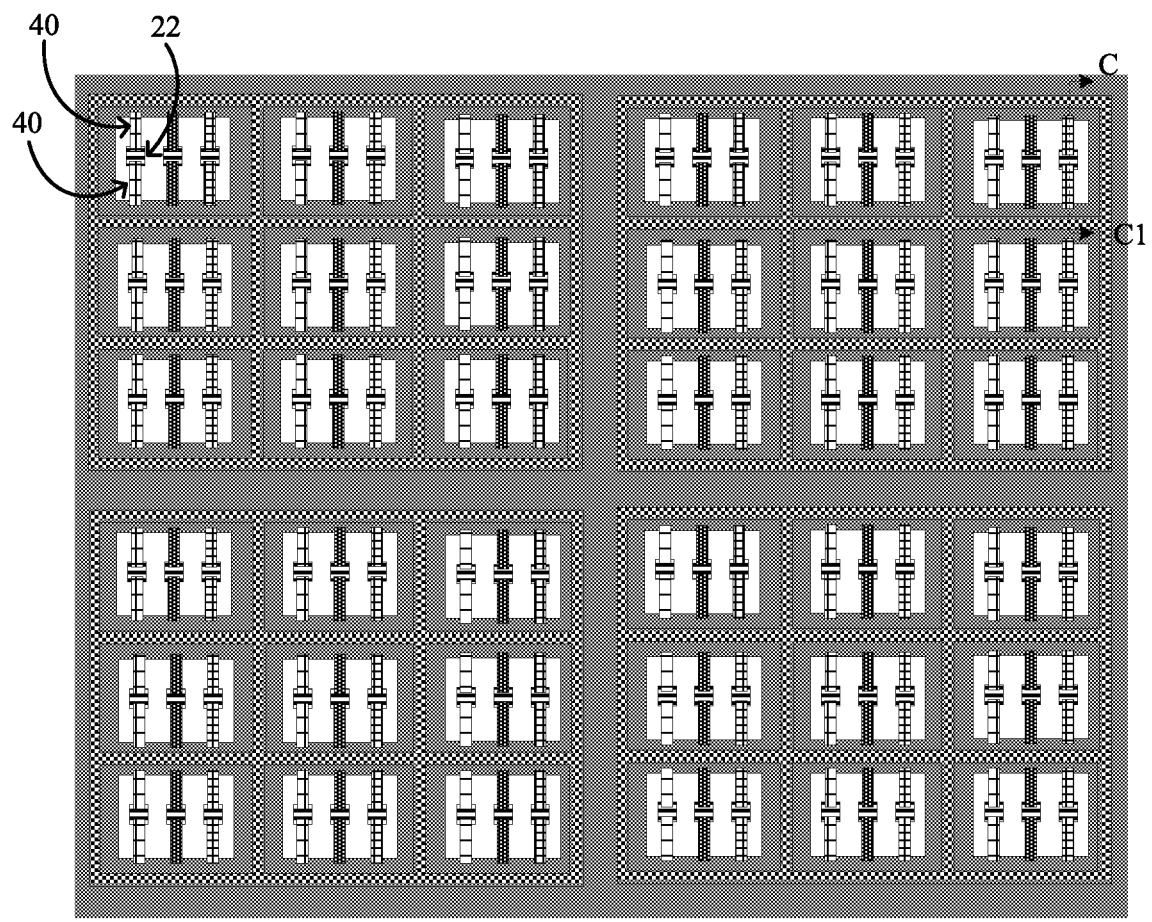
FIG. 19 is a vertical view of a display panel according to another embodiment of the present disclosure.
Figure 20:
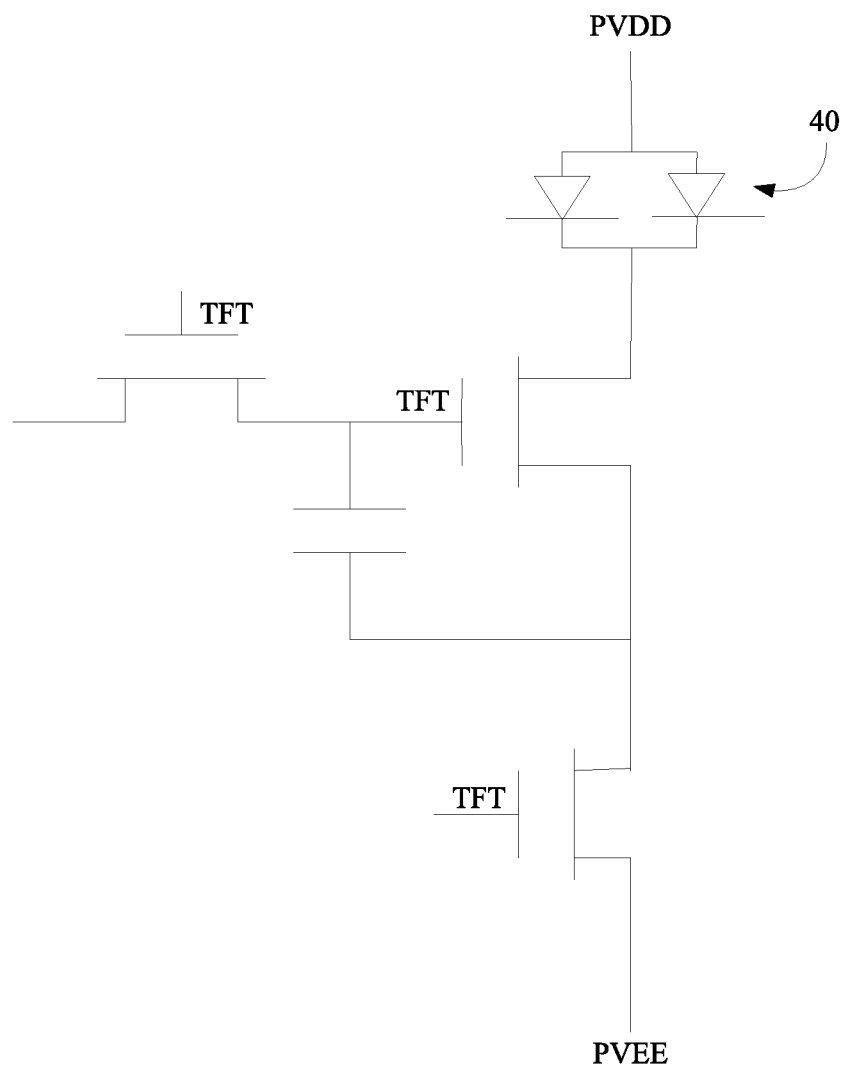
FIG. 20 is a schematic diagram showing an electrical connection of a light-emitting unit in a display panel according to another embodiment of the present disclosure.

In one embodiment, based on the above embodiments, in an embodiment of the present disclosure, as shown in FIG. 15, FIG. 19 and FIG. 20, FIG. 15 is a sectional view of FIG. 19 along C-C1 direction. The second contact electrodes of at least two of the light-emitting units 40 are electrically connected with a same second electrode 22, so that the third electrode may simultaneously provide, via the second electrode 22, a driving current for the at least two of the light-emitting units 40 electrically connected with the second electrode 22, to drive the light-emitting units 40 to emit light. In one embodiment, the at least two of the light-emitting units 40 electrically connected with a same second electrode 22 are light-emitting units having a same color, to reduce a probability of poor display of the display panel due to a failure of a single light-emitting unit.

Based on the above embodiments, in an embodiment of the present disclosure, the at least two of the light-emitting units 40 electrically connected with the same second electrode 22 are arranged in a same first hollow, to reduce a process difficulty in connecting the second contact electrodes of the at least two of the light-emitting units with the same second electrode 22.

In one embodiment, based on the above embodiments, in an embodiment of the present disclosure, as shown in FIG. 19 and FIG. 20, the second contact electrodes of two of the light-emitting units 40 are connected with the same second electrode 22, to reduce the probability of poor display of the display panel due to a failure of a single light-emitting unit 40, reduce the number of the light-emitting units in the display panel, and reduce process difficulty and cost. However, the present disclosure is not limited thereto, and it depends on the actual situations.

Based on the above embodiments, in an embodiment of the present disclosure, as shown in FIG. 19, two of the light-emitting units 40 connected with the same second electrode 22 are arranged on a same straight line, and the second electrode 22 electrically connected with the two light-emitting units 40 is arranged in a middle of the two light-emitting units 40. However, the present disclosure is not limited thereto. In other embodiment of the present disclosure, two of the light-emitting units connected with a same second electrode may also be in other arrangement, and the two light-emitting units and the second electrode electrically connected with the two light-emitting units may also have other relative position relationship, which depends on the actual situations.

Figure 21:
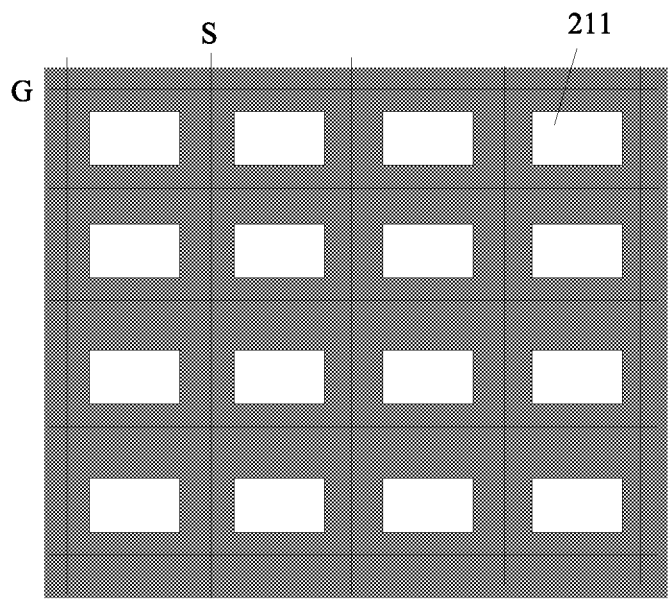
FIG. 21 is a vertical view of a display panel according to another embodiment of the present disclosure.

It should be noted that, in an embodiment of the present disclosure, as shown in FIG. 21, the display panel further includes multiple data lines S and multiple scan lines G The multiple data lines S and the multiple scan lines G are crossed to form multiple pixel areas, and the pixel areas have a one-to-one correspondence with the first hollows 211. In one embodiment, in an embodiment of the present disclosure, in a case that two of the light-emitting units connected with a same second electrode are arranged on a same straight line, the two light-emitting units may be arranged along an extension direction of the data line, or may also be arranged along an extension direction of the scan line, which is not limited in the present disclosure, and it depends on the actual situations.

Based on any one of the above embodiments, in an embodiment of the present disclosure, the multiple light-emitting units have at least two colors, to realize display of a color picture. In one embodiment, in an embodiment of the present disclosure, the multiple light-emitting units have three colors, and include a red light-emitting unit, a blue light-emitting unit and a green light-emitting unit. However, the present disclosure is not limited thereto. In other embodiment of the present disclosure, the light-emitting units may further include light-emitting units of other colors, which depends on the actual situations.

In an embodiment of the present disclosure, the light-emitting units of at least two colors are arranged in a same first hollow. That is, if the multiple light-emitting units includes light-emitting units of two colors, each of the first hollows includes light-emitting units of two colors. If the multiple light-emitting units include light-emitting units of three colors, each of the first hollows includes light-emitting units of three colors. Take the multiple light-emitting units including a red light-emitting unit, a green light-emitting unit and a blue light-emitting unit as an example. As shown in FIG. 18, each of the first hollows includes light-emitting units of three colors, that is, a red light-emitting unit 41, a blue light-emitting unit 42 and a green light-emitting unit 43. But the present disclosure is not limited thereto, and it depends on the actual situations.

In one embodiment, based on any one of the above embodiments, in an embodiment of the present disclosure, at least two of the second electrodes are arranged in a same one of the first hollows, and at least two of the light-emitting units are electrically connected with at least two of the second electrodes respectively. In a same one of the first hollows, a different second electrode is electrically connected with a light-emitting unit of a different color, to independently control light-emitting units of different colors in the same one of the first hollows, and to form a color image in an area corresponding to the first hollow. It should be noted that, in an embodiment of the present disclosure, in a case that at least two light-emitting units having a same color are arranged in a same one of the first hollows, the light-emitting units having the same color in the same one of the first hollows are electrically connected with a same second electrode, for the sake of uniform control on the light-emitting units of the same color in the same one of the first hollows.

Based on any one of the above embodiments, in an embodiment of the present disclosure, as shown in FIG. 17, the first contact electrode 401 is a positive pole of the light-emitting unit, and the first contact electrode 401 is electrically connected with a P-type semiconductor layer of the light-emitting unit. The second contact electrode 402 is a negative pole of the light-emitting unit, and the second contact electrode 402 is electrically connected with a N-type semiconductor layer of the light-emitting unit. In an embodiment of the present application, as shown in FIG. 15 and FIG. 16, the first electrode 21 is directly connected with the first contact electrode 401 to provide a voltage PVDD for the light-emitting unit 40, and a voltage PVEE provided by the third electrode is transmitted to the light-emitting unit via the multiple TFTs and the second contact electrode 402.

Figure 22:
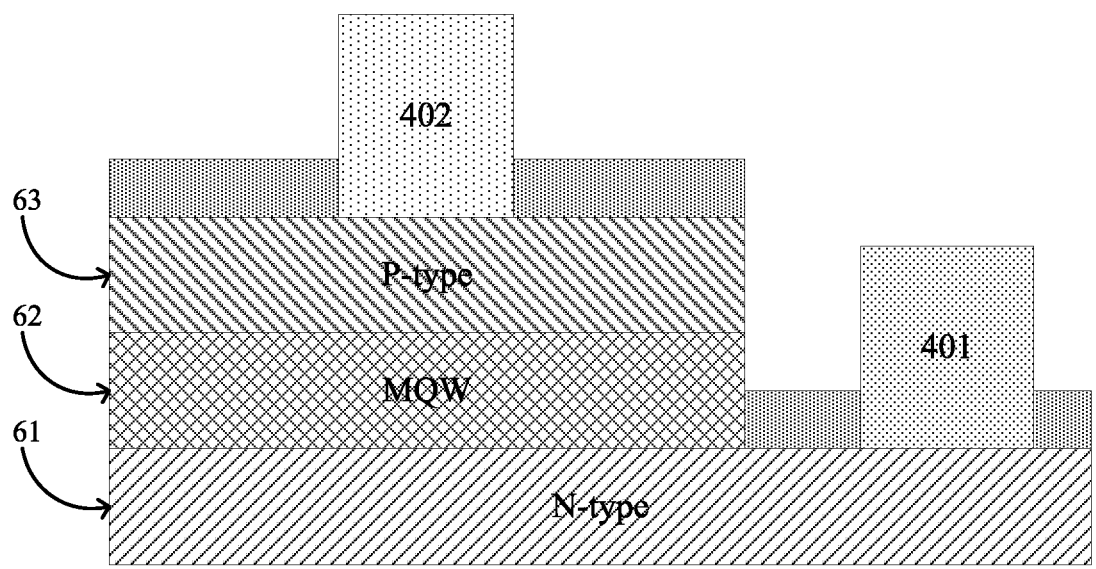
FIG. 22 is a schematic structural diagram of a light-emitting unit in a display panel according to another embodiment of the present disclosure.
Figure 23:
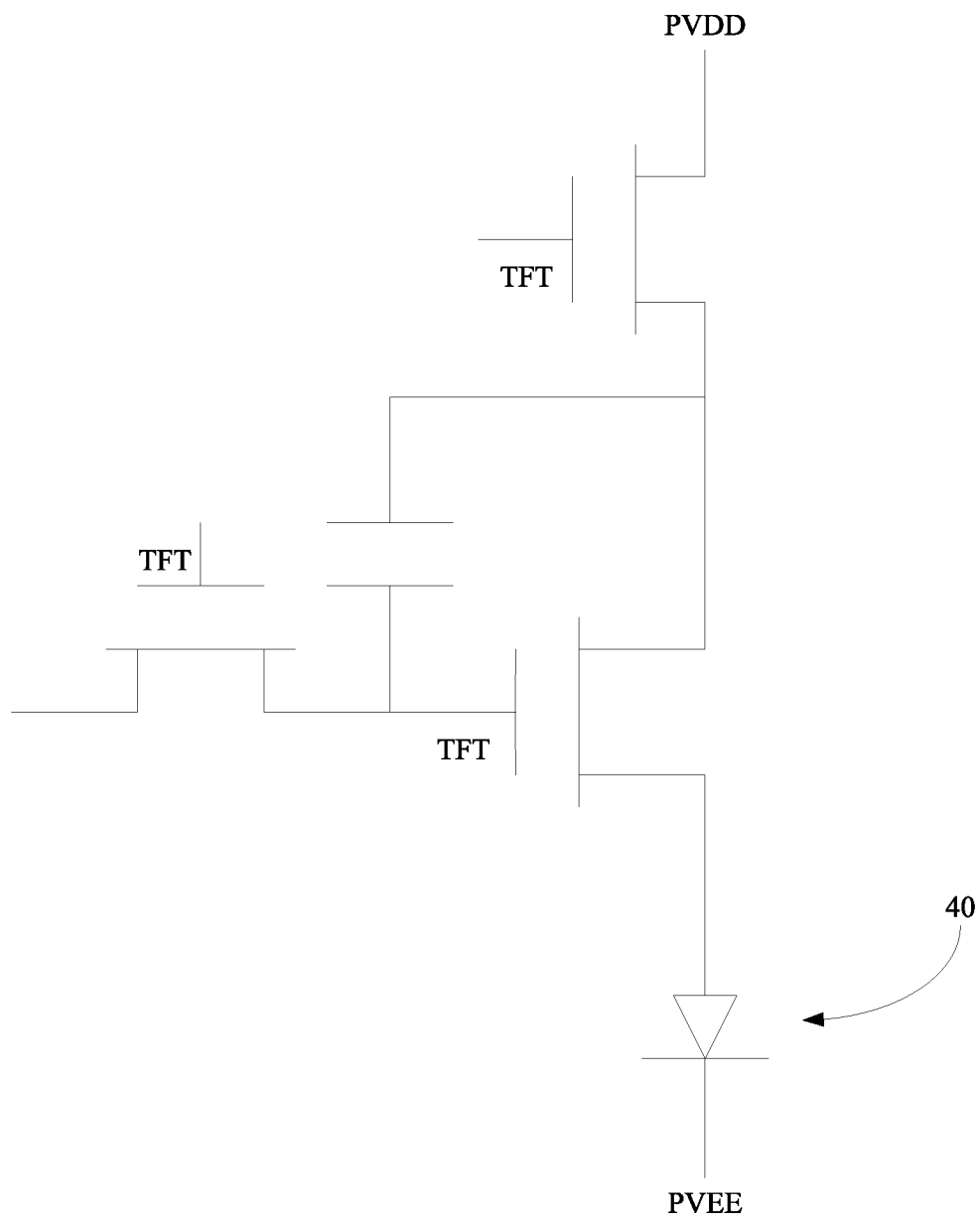
FIG. 23 is a schematic diagram showing an electrical connection of a light-emitting unit in a display panel according to another embodiment of the present disclosure.

In another embodiment of the present disclosure, as shown in FIG. 22, the first contact electrode 401 is a negative pole of the light-emitting unit, and the first contact electrode 401 is electrically connected with a N-type semiconductor layer of the light-emitting unit. The second contact electrode 402 is a positive pole of the light-emitting unit, and the second contact electrode 402 is electrically connected with a P-type semiconductor layer of the light-emitting unit. As shown in FIG. 23, in an embodiment of the present disclosure, the first electrode 21 is directly connected with the first contact electrode, and a voltage PVEE provided by the first electrode is directly transmitted to the light-emitting unit 40. The third electrode is electrically connected with the second contact electrode via the multiple TFTs, and a voltage PVDD provided by the third electrode is transmitted to the light-emitting unit via the multiple TFTs and the second contact electrode. However, the present disclosure is not limited thereto, and it depends on the actual situations.

It should be noted that, in the above embodiments, the light-emitting unit is a horizontal LED, that is, the first contact electrode 401 and the second contact electrode 402 are both arranged on a side of the first semiconductor layer 31 facing toward the second semiconductor layer 63. In one embodiment, the light-emitting unit 40 may be electrically connected with the first electrode 21 and the second electrode 22 respectively through binding.

The display panel according to the embodiment of the present disclosure is described as follows by taking the first contact electrode being the negative pole of the light-emitting unit and the second contact electrode being the positive pole of the light-emitting unit as an example.

Figure 24:
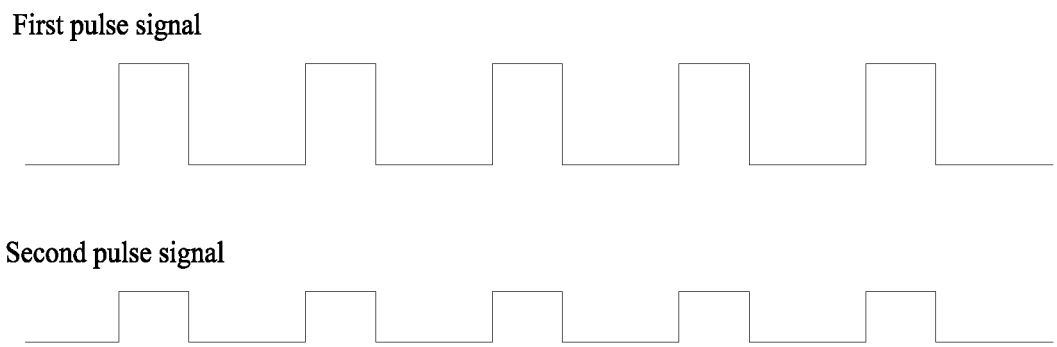
FIG. 24 is a schematic diagram of a first pulse signal and a second pulse signal in a display panel according to another embodiment of the present disclosure.

Based on any one of the above embodiments, in an embodiment of the present disclosure, during a touch detection stage of the display panel, the first touch electrode receives a touch driving signal, and the touch driving signal is a first pulse signal. The first power supply voltage provided by the first electrode to the light-emitting unit includes a second pulse signal. As shown in FIG. 24, the first pulse signal includes a first voltage and a second voltage which are arranged alternately, and the first voltage is less than the second voltage. The second pulse signal includes a third voltage and a fourth voltage which are arranged alternately, and the third voltage is less than the fourth voltage. A time period in which the first pulse signal is at the second voltage is overlapped with a time period in which the second pulse signal is at the fourth voltage in time, to increase a voltage of the first electrode during at least part of a time period for providing the second voltage to the first touch electrode, and reduce a voltage difference between the first touch electrode and the first electrode during the overlapping time period, and reducing the load of the display panel.

It should be noted that, a process of implementing display and touch detection of the display panel includes a display stage and a touch detection stage. The display stage includes a reset stage and a light-emitting stage which are periodic. The reset stage is a data writing stage. In the reset stage, a transistor, among the multiple TFTs, connected with the light-emitting unit operates in a cut-off region, and there is no current flowing through the light-emitting unit. In the light-emitting stage, a transistor, among the multiple TFTs, connected with the light-emitting unit operates in a saturation region, and a current flowing through the light-emitting unit does not increase with increase of the first power supply voltage.

Therefore, in one embodiment of the present disclosure, the touch detection stage and the reset stage are not overlapped, to avoid affecting the display of the display panel when adjusting the voltage of the first electrode. The touch detection stage is at least partially overlapped with the light-emitting stage, to reduce the load of the first touch electrode by adjusting the first power supply voltage in the light-emitting stage, and reducing the load of the display panel.

Figure 25:
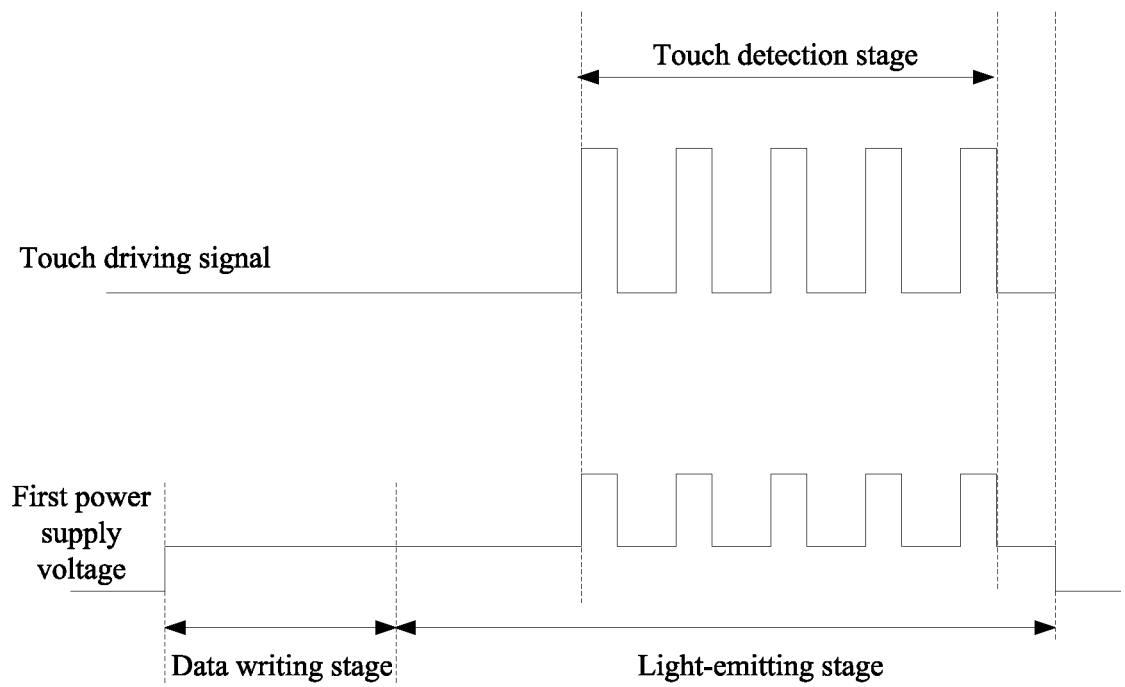
FIG. 25 is a schematic diagram of a touch driving signal and a first power supply voltage in a display panel according to another embodiment of the present disclosure.

It should be noted that in a non-touch detection stage, that is, in the reset stage and a non-overlapping time period between the light-emitting stage and the touch detection stage, the first power supply voltage is a constant value, to avoid a change in brightness of the light-emitting unit due to a change of the first power supply voltage during the reset stage. As shown in FIG. 25, in an embodiment of the present disclosure, the first power supply voltage is a constant value during the reset stage, the first power supply voltage includes a second pulse signal during an overlapping time period between the light-emitting stage and the touch detection stage, and the first power supply voltage is also a constant value during a non-overlapping time period between the light-emitting stage and the touch detection stage.

Figure 26:
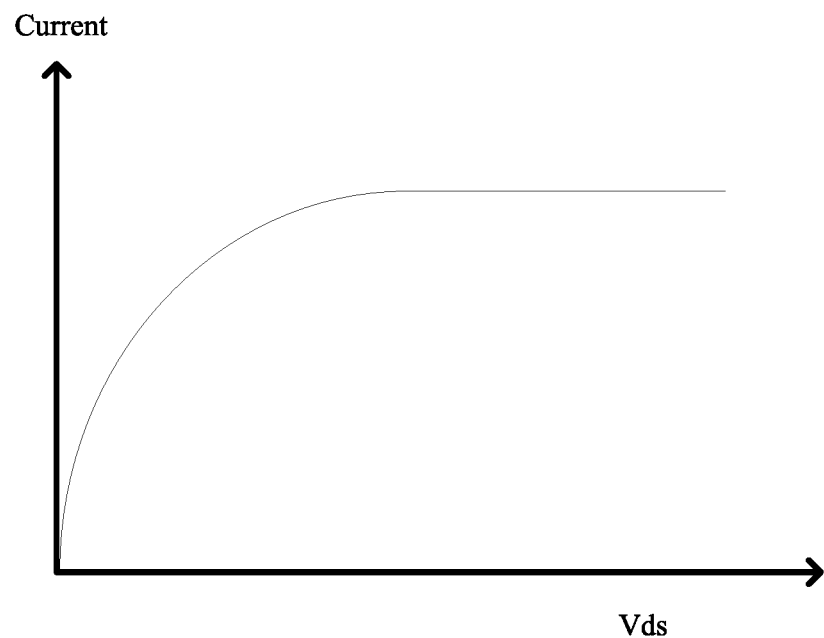
FIG. 26 is a schematic diagram showing a change curve of a current flowing through a driving transistor with its source-drain voltage difference in a display panel according to another embodiment of the present disclosure.

Based on the above embodiments, in an embodiment of the present disclosure, the display panel further includes a driving transistor, and the driving transistor is configured to drive the light-emitting unit to emit light. As shown in FIG. 26, FIG. 26 shows a change curve of a current flowing through the driving transistor with its source-drain voltage difference, in which, an abscissa represents the voltage difference between the source and the drain of the driving transistor, and an ordinate represents the current flowing through the driving transistor. It can be seen from FIG. 26 that, when the voltage difference between the source and the drain of the driving transistor is greater than a certain value, the driving transistor operates in a saturation region, the current flowing through the driving transistor does not change along with the voltages applied to the source and the drain of the driving transistor. It should be noted that, in an embodiment of the present disclosure, during the touch detection stage, the driving transistor operates in the saturation region (that is, the current flowing through the driving transistor does not increase with an increase of the voltages applied to the source and the drain of the driving transistor), so that the brightness of the light-emitting unit does not change with an increase of the first power supply voltage during the touch detection stage. In one embodiment, the driving transistor is a TFT, among the multiple TFTs, which is directly connected with the light-emitting unit.

It should be noted that, a saturation voltage of the driving transistor is small, while a large driving voltage is required for the first touch electrode upon performing touch detection. Therefore, in one embodiment of the present disclosure, in the non-touch detection stage, a voltage value of the first power supply voltage is the third voltage, which reduces the complexity in controlling change of the first power supply voltage and reduces a power consumption of the display panel in the non-touch detection stage. In the touch detection stage, a voltage value of the first power supply voltage is raised to the fourth voltage, to reduce the voltage difference between the first touch electrode and the first electrode, and reducing the load of the display panel.

Based on the above embodiment, in an embodiment of the present disclosure, the second voltage and the fourth voltage meet a preset condition, and the preset condition includes that a ratio of the fourth voltage to the second voltage ranges from 0.4 to 1.4, inclusive, to reduce a difference between the second voltage and the fourth voltage when providing the second voltage to the first touch electrode, and reducing the load of the display panel upon performing touch detection. In one embodiment, in an embodiment of the present disclosure, the second voltage is the same as the fourth voltage, to reduce the difference between the second voltage and the fourth voltage as much as possible when providing the second voltage to the first touch electrode, and reducing the load of the display panel upon performing the touch detection. However, the present disclosure is not limited thereto, and it depends on the actual situations.

Figure 27:
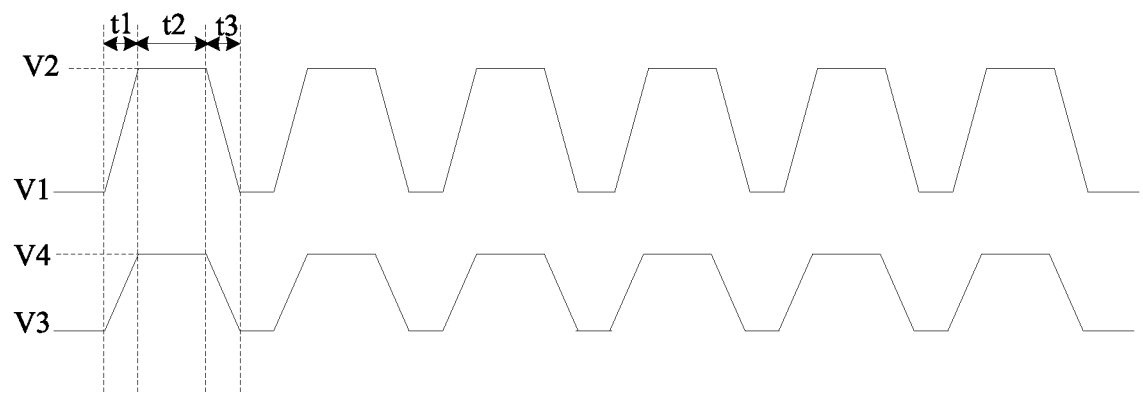
FIG. 27 is a schematic diagram of a first pulse signal and a second pulse signal in a display panel according to another embodiment of the present disclosure.

It should be noted that, in practice, a voltage signal of the first touch electrode changes continuously, rather than jumps. Therefore, based on any one of the above embodiments, in an embodiment of the present disclosure, as shown in FIG. 27, a signal during the touch detection stage has a signal rising stage t1, a signal maintaining stage t2 and a signal falling stage t3. In the signal rising stage t1, the voltage of the first touch electrode is changed from the first voltage V1 to the second voltage V2, and the first power supply voltage supplied by the first electrode to the light-emitting unit is changed from the third voltage V3 to the fourth voltage V4. In the signal falling stage t3, the voltage of the first touch electrode is changed from the second voltage V2 to the first voltage V1, and the first power supply voltage supplied by the first electrode to the light-emitting unit is changed from the fourth voltage V4 to the third voltage V3. In the signal maintaining stage t2, the first touch electrode maintains the second voltage V2, and the first electrode maintains the fourth voltage V4.

In one embodiment, based on the above embodiments, in an embodiment of the present disclosure, a time instance at which the first power supply voltage is changed from the third voltage to the fourth voltage is no earlier than a time instance at which the voltage of the first touch electrode is changed from the first voltage to the second voltage, to avoid an additional load introduced by an earlier increasing of the voltage of the first electrode, when the load of the display panel upon performing touch detection is reduced by increasing the voltage of the first electrode. However, the present disclosure is not limited thereto, and it depends on the actual situations.

Based on any one of the above embodiments, in an embodiment of the present disclosure, a time instance at which the first power supply voltage is changed from the fourth voltage to the third voltage is no later than a time instance at which the voltage of the first touch electrode is changed from the second voltage to the first voltage, to avoid an additional load introduced by a later decreasing of the voltage of the first electrode, when the load of the display panel upon performing touch detection is reduced by increasing the voltage of the first electrode. However, the present disclosure is not limited thereto, and it depends on the actual situations.

In one embodiment, based on the above embodiments, in an embodiment of the present disclosure, a pulse width of the fourth voltage is less than or equal to a pulse width of the second voltage, to avoid introducing an additional load during a time period in which the voltage of the first electrode maintains at the fourth voltage. In an embodiment of the present disclosure, the pulse width of the fourth voltage is equal to the pulse width of the second voltage, to make the voltage of the first electrode maintains at the fourth voltage as much as possible when the voltage of the first touch electrode maintains at the second voltage, and reduce the load of the display panel to the most extent, when an additional load is avoided during a time period when the voltage of the first electrode maintain at the fourth voltage. However, the present disclosure is not limited thereto. In other embodiment of the present disclosure, the pulse width of the fourth voltage may be less than the pulse width of the second voltage, which depends on the actual situations.

Figure 28:
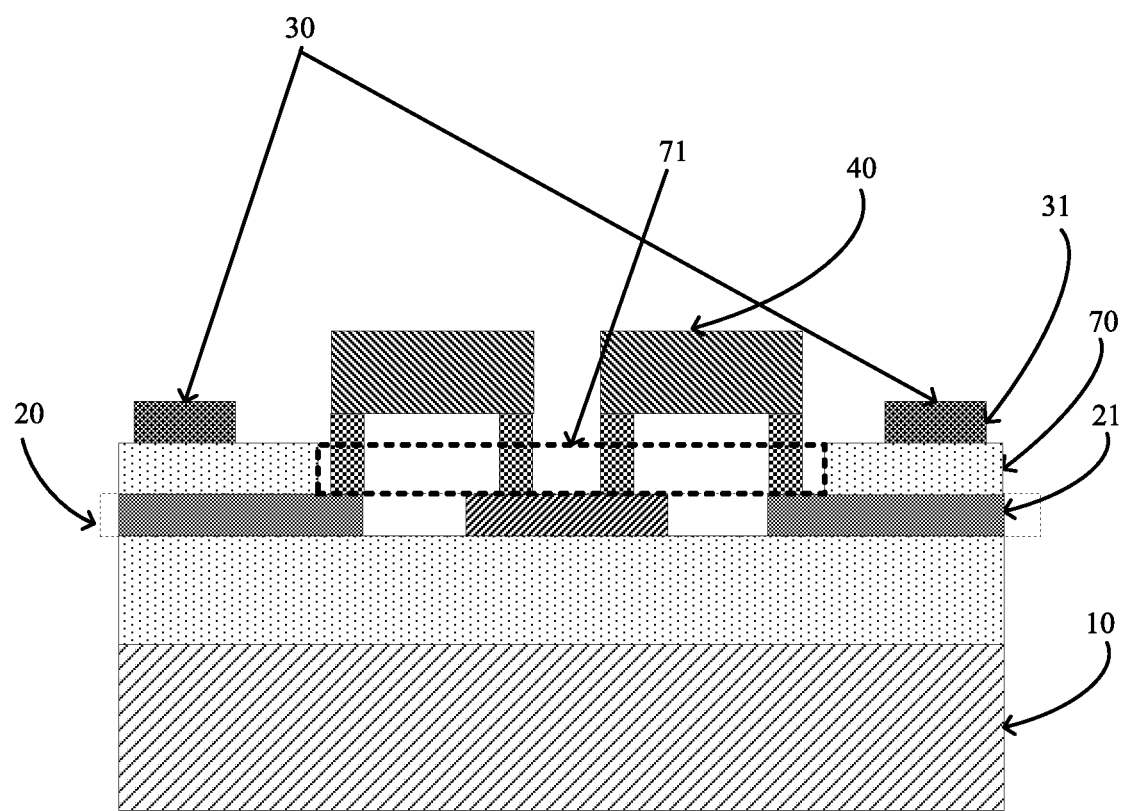
FIG. 28 is a schematic structural diagram of a display panel according to another embodiment of the present disclosure.

Based on any one of the above embodiments, in an embodiment of the present disclosure, as shown in FIG. 28, the display panel further includes an insulation layer 70. The insulation layer 70 is arranged between the first electrode layer 20 and the first touch layer 30, and the insulation layer 70 is configured to insulate the first touch electrode 31 and the first electrode 21 from each other. In one embodiment, in an embodiment of the present disclosure, as shown in FIG. 28, the insulation layer 70 includes multiple second hollows 71. An orthographic projection of the first hollows 211 on the first substrate 10 falls within an orthographic projection of the second hollows 71 on the first substrate 10, to prevent the insulating layer 70 from being partially located directly under the light-emitting unit 40 and affecting the display brightness of the display panel. However, the present disclosure is not limited thereto, and it depends on the actual situations.

Based on the above embodiments, in an embodiment of the present disclosure, the insulation layer is made of an organic material, that is, the insulation layer is an organic insulation layer, to reduce a dielectric constant of the insulation layer and reduce the load of the display panel. However, the present disclosure is not limited thereto, and it depends on the actual situations.

Based on any one of the above embodiments, in an embodiment of the present disclosure, the touch detection of the display panel is a self-capacitance touch detection, and the first touch electrode is a self-capacitance electrode, so that in the display panel integrated with the touch detection function, the thickness of the display panel is reduced, which is suitable to the development of thinner and lighter electronic devices. However, the present disclosure is not limited thereto. In other embodiment of the present disclosure, the touch detection of the display panel may further be a mutual capacitance touch detection.

Figure 29:
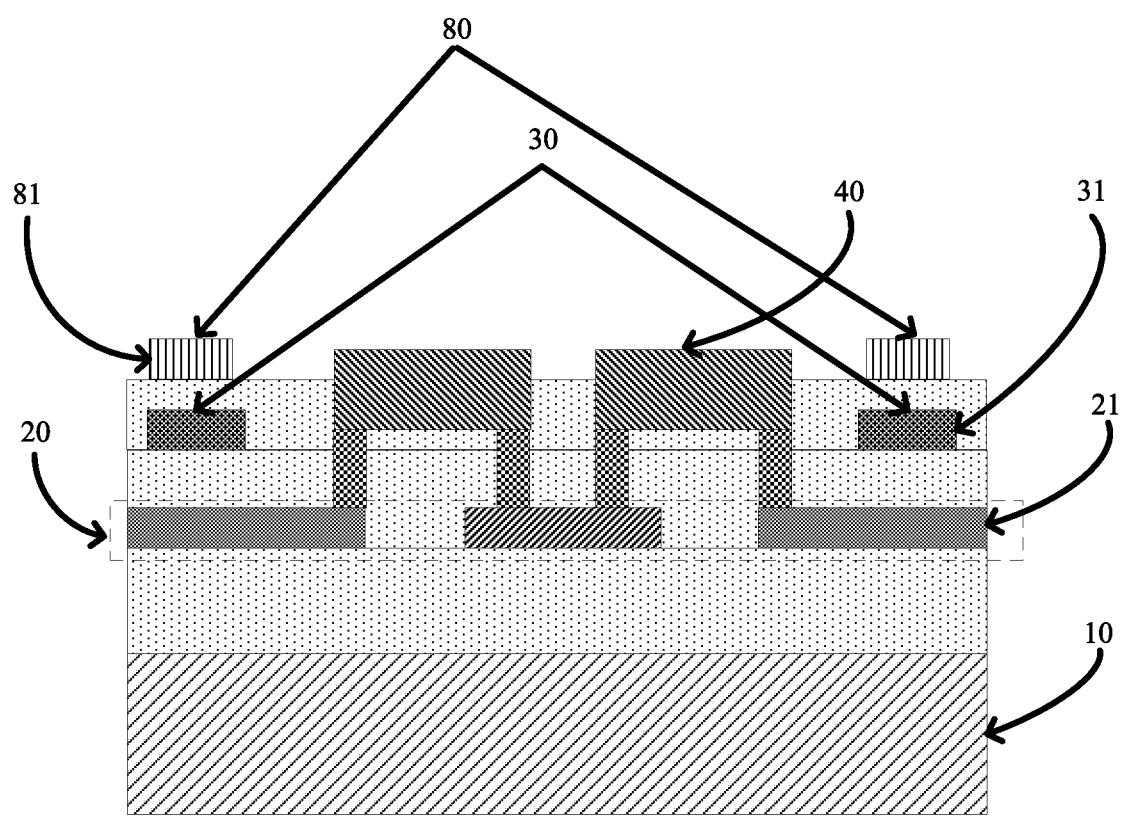
FIG. 29 is a schematic structural diagram of a display panel according to another embodiment of the present disclosure.
Figure 30:
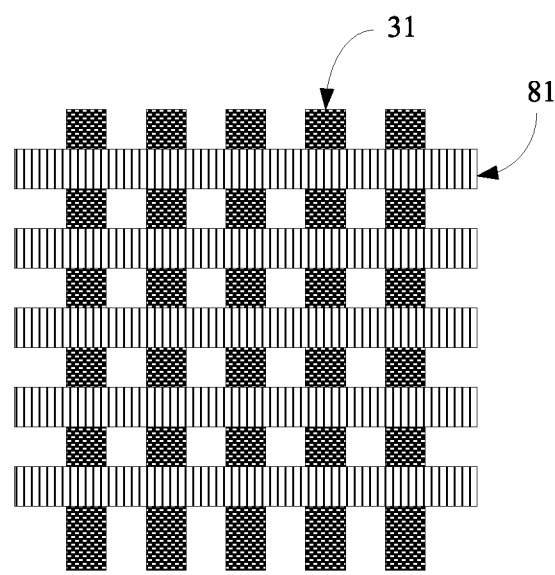
FIG. 30 is a vertical view of a first touch electrode and a second touch electrode in a display panel according to another embodiment of the present disclosure.

In an embodiment of the present disclosure, in a case that the touch detection of the display panel is the mutual capacitance touch detection, as shown in FIG. 29 and FIG. 30, the display panel further includes a second touch layer 80. The second touch layer 80 is insulated from the first touch layer 30. The second touch layer 80 includes multiple second touch electrodes 81. The first touch electrode 31 is a driving electrode. The second touch electrode 81 is a sensing electrode. The first touch electrode 31 and the second touch electrode 81 are crossed with each other, to realize the touch detection by using a capacitance change formed between the driving electrode and the sensing electrode.

In one embodiment, based on the above embodiments, in an embodiment of the present disclosure, as shown in FIG. 29, the second touch layer 80 is arranged on a side of the first touch layer 30 which is away from the first electrode layer 20, to avoid affecting an effect of reducing the load of the display panel by adjusting the voltage of the first electrode 21 if the second touch layer 80 is arranged between the first touch layer 30 and the first electrode layer 20. However, the present disclosure is not limited thereto, and it depends on the actual situations.

Accordingly, a display device is further provided in an embodiment of the present disclosure. The display device includes the display panel according to any one of the above embodiments. In one embodiment, the display device may be electronic devices with a touch display function, such as a mobile phone, a tablet computer or the like.

In summary, in the display panel and the display device according to the embodiments of the present disclosure, the first touch layer is arranged in a different layer from the first electrode layer and is insulated from the first electrode layer; the first touch layer includes multiple first touch electrodes, each of the first touch electrodes is mesh-shaped and includes multiple touch electrode segments; the multiple touch electrode segments are crossed to form meshes of the first touch electrode; an orthographic projection of at least one of the touch electrode segments on the first substrate falls within an orthographic projection of the first electrode on the first substrate, so that the first touch electrodes are at least partially overlapped with the first electrode in a direction perpendicular to a plane where the first substrate is located. As a result, when a driving signal is provided to the first touch electrodes, the driving signal may also be provided to the first electrode overlapped with the first touch electrodes, thus reducing a voltage difference between the first touch electrodes and the first electrode overlapped with the first touch electrodes, and reducing a load of the first touch electrodes when being driven, to reduce the load of the display panel when performing touch detection.

The embodiments in the specification are described in a combination of parallel and progressive ways, and each embodiment lays emphasis on differences from other embodiments. For the same or similar parts between various embodiments, reference may be made to each other.

What is claimed is:

1. A display panel, comprising:
a first substrate; and
a first electrode layer, a first touch layer and a plurality of light-emitting units which are all arranged on a side of the first substrate, wherein
the first electrode layer comprises a first electrode, the first electrode comprises a plurality of first hollows, and the first electrode is configured to provide a first power supply voltage for the plurality of light-emitting units;
the first touch layer is arranged in a different layer from the first electrode layer and is insulated from the first electrode layer, the first touch layer comprises a plurality of first touch electrodes, each of the first touch electrodes is mesh-shaped and comprises a plurality of touch electrode segments, and the plurality of touch electrode segments are crossed to form meshes of the first touch electrode; and
an orthographic projection of at least one of the touch electrode segments on the first substrate falls within an orthographic projection of the first electrode on the first substrate,
wherein an orthographic projection of the at least one of the touch electrode segments on a plane where the first electrode is located, is located between adjacent first hollows in the first electrode, and a width of a touch electrode segment is less than a distance between adjacent two first hollows which are located on both sides of the touch electrode segment.

2. The display panel according to claim 1, wherein orthographic projections of at least a part of the touch electrode segments of at least two of the first touch electrodes on the plane where the first electrode is located, are located between a same pair of adjacent two first hollows.

3. The display panel according to claim 1, further comprising a plurality of touch signal lines, wherein
the touch signal lines are connected with the first touch electrodes respectively, the touch signal lines are arranged in a same layer as the first touch electrodes, and an orthographic projection of each of the touch signal lines on the first substrate falls within the orthographic projection of the first electrode on the first substrate.

4. The display panel according to claim 1, wherein the plurality of touch electrode segments comprise a first touch electrode segment and a second touch electrode segment which are crossed with each other, wherein
the first touch electrode segment extends along a first direction, the second touch electrode segment extends along a second direction, the first direction and the second direction are both parallel to a plane where the first substrate is located, and the first direction is crossed with the second direction; and
the plurality of first hollows are arranged in an array, the first electrode covers the first touch electrode segment and the second touch electrode segment which are crossed and connected with each other.

5. The display panel according to claim 1, further comprising a driving circuit layer, wherein the driving circuit layer is arranged between the first substrate and the first electrode layer, and the first touch layer is arranged on a side of the first electrode layer which is away from the first substrate.

6. The display panel according to claim 5, wherein the driving circuit layer comprises a plurality of thin film transistors;
each of the plurality of light-emitting units comprises a first contact electrode and a second contact electrode, the first contact electrode is electrically connected with the first electrode, and the second contact electrode is electrically connected with at least one of the thin film transistors.

7. The display panel according to claim 6, wherein the plurality of light-emitting units are arranged on the side of the first electrode layer which is away from the first substrate.

8. The display panel according to claim 6, wherein the first electrode layer further comprises a plurality of second electrodes, wherein
the second electrodes are arranged in the first hollows, the second electrodes are insulated from the first electrode, the second contact electrodes are electrically connected with the second electrodes, the second electrodes are connected with a third electrode via at least one of the thin film transistors, and the third electrode is configured to provide a second power supply voltage.

9. The display panel according to claim 8, wherein the second contact electrodes of at least two of the plurality of light-emitting units are connected to a same second electrode.

10. The display panel according to claim 8, wherein at least two of the second electrodes are arranged in one of the first hollows, and at least two of the plurality of light-emitting units are electrically connected with at least two of the second electrodes in a same first hollow respectively.

11. The display panel according to claim 6, wherein
the first contact electrode is a positive pole of one of the plurality of light-emitting units, and the second contact electrode is a negative pole of the one of the plurality of light-emitting units; or
the first contact electrode is the negative pole of the one of the plurality of the light-emitting units, and the second contact electrode is the positive pole of the one of the plurality of the light-emitting units.

12. The display panel according to claim 1, wherein during a touch detection stage of the display panel, the first touch electrodes each receives a touch driving signal, the touch driving signal is a first pulse signal, and the first power supply voltage provided by the first electrode to the plurality of light-emitting units comprises a second pulse signal, wherein
the first pulse signal comprises a first voltage and a second voltage which are set alternately, and the first voltage is less than the second voltage;
the second pulse signal comprises a third voltage and a fourth voltage which are set alternately, and the third voltage is less than the fourth voltage; and
a time period in which the first pulse signal is at the second voltage is overlapped with a time period in which the second pulse signal is at the fourth voltage in time.

13. The display panel according to claim 12, wherein the second voltage and the fourth voltage meet a preset condition, and the preset condition comprises that a ratio of the fourth voltage to the second voltage ranges from 0.4 to 1.4, inclusive.

14. The display panel according to claim 13, wherein during the touch detection stage, a signal has a signal rising stage, a signal maintaining stage and a signal falling stage, wherein
in the signal rising stage, a voltage across each first touch electrode is changed from the first voltage to the second voltage, and the first power supply voltage provided by the first electrode to the plurality of light-emitting units is changed from the third voltage to the fourth voltage; and
in the signal falling stage, the voltage across each first touch electrode is changed from the second voltage to the first voltage, and the first power supply voltage provided by the first electrode to the plurality of light-emitting units is changed from the fourth voltage to the third voltage.

15. The display panel according to claim 14, wherein
a time instance at which the first power supply voltage is changed from the third voltage to the fourth voltage is no earlier than a time instance at which the voltage across each first touch electrode is changed from the first voltage to the second voltage; and
a time instance at which the first power supply voltage is changed from the fourth voltage to the third voltage is no later than a time instance at which the voltage across the first touch electrode is changed from the second voltage to the first voltage.

16. The display panel according to claim 15, wherein a pulse width of the fourth voltage is less than or equal to a pulse width of the second voltage.

17. The display panel according to claim 12, further comprising a driving transistor, wherein
the driving transistor is configured to drive the plurality of light-emitting units to emit light; and
during the touch detection stage, the driving transistor operates in a saturation region.

18. The display panel according to claim 1, further comprising an insulation layer, wherein
the insulation layer is arranged between the first electrode layer and the first touch layer, and is configured to insulate the first touch electrodes from the first electrode;
the insulation layer comprises a plurality of second hollows; and
an orthographic projection of each of the first touch electrodes on the first substrate falls within an orthographic projection of the insulation layer on the first substrate.

19. A display device, comprising a display panel, wherein the display panel comprises:
a first substrate; and
a first electrode layer, a first touch layer and a plurality of light-emitting units which are all arranged on a side of the first substrate, wherein
the first electrode layer comprises a first electrode, the first electrode comprises a plurality of first hollows, and the first electrode is configured to provide a first power supply voltage for the plurality of light-emitting units;
the first touch layer is arranged in a different layer from the first electrode layer and is insulated from the first electrode layer, the first touch layer comprises a plurality of first touch electrodes, each of the first touch electrodes is mesh-shaped and comprises a plurality of touch electrode segments, and the plurality of touch electrode segments are crossed to form meshes of the first touch electrode; and
an orthographic projection of at least one of the touch electrode segments on the first substrate falls within an orthographic projection of the first electrode on the first substrate,
wherein an orthographic projection of the at least one of the touch electrode segments on a plane where the first electrode is located, is located between adjacent first hollows in the first electrode, and a width of a touch electrode segment is less than a distance between adjacent two first hollows which are located on both sides of the touch electrode segment.

* * * * *